US011176501B2

(12) United States Patent
Scullion et al.

(10) Patent No.: US 11,176,501 B2
(45) Date of Patent: Nov. 16, 2021

(54) METHODS AND SYSTEMS TO TRACK RELOCATION STATUS

(71) Applicant: Telescio, LLC, Jacksonville, FL (US)

(72) Inventors: Mark Scullion, Saint Johns, FL (US); Len O'Neill, Ponte Vedra Beach, FL (US); Jonathan Vu Tran, Anaheim, CA (US); Caryn Knill, St. Augustine, FL (US); Timothy Meyer, Jacksonville, FL (US)

( * ) Notice: Subject to any disclaimer, the term of this patent is extended or adjusted under 35 U.S.C. 154(b) by 165 days.

(21) Appl. No.: 16/221,581

(22) Filed: Dec. 17, 2018

(65) Prior Publication Data

US 2019/0197459 A1    Jun. 27, 2019

Related U.S. Application Data

(60) Provisional application No. 62/610,233, filed on Dec. 24, 2017.

(51) Int. Cl.
*G06Q 10/06* (2012.01)
*G06Q 10/08* (2012.01)

(52) U.S. Cl.
CPC ........... *G06Q 10/063114* (2013.01); *G06Q 10/06316* (2013.01); *G06Q 10/087* (2013.01)

(58) Field of Classification Search
None
See application file for complete search history.

(56) References Cited

U.S. PATENT DOCUMENTS

| 8,429,019 | B1* | 4/2013 | Yeatts | G06Q 10/083 |
| | | | | 705/26.1 |
| 10,198,707 | B1* | 2/2019 | Bolton | G06Q 10/0837 |
| 2004/0030572 | A1* | 2/2004 | Campbell | G06Q 10/0833 |
| | | | | 705/333 |
| 2008/0077530 | A1* | 3/2008 | Banas | G06Q 10/06313 |
| | | | | 705/50 |
| 2014/0344097 | A1* | 11/2014 | Horowitz | G06Q 10/08345 |
| | | | | 705/26.4 |
| 2017/0024685 | A1* | 1/2017 | DiSorbo | G06Q 10/06398 |

* cited by examiner

*Primary Examiner* — Arif Ullah
(74) *Attorney, Agent, or Firm* — Wilson Dutra, PLLC; Camille A. Wilson

(57) ABSTRACT

The present disclosure provides generally for methods and systems relating to relocation management. More specifically, the methods and systems relate to monitoring and assessing the progress and status of a relocation. In some aspects, a move plan may be developed to perform a relocation, wherein the move plan may organize the logistics of the project. In some embodiments, a move plan may comprise move segments that may allow for more detailed logistics management and monitoring. In some implementations, a progress formula may be generated for a relocation based at least in part on the move plan, which may allow for a dynamic and accurate understanding of the progress and status of a relocation.

17 Claims, 20 Drawing Sheets

| Select a Move | |
|---|---|
| Product A | 01/01/19 |
| Customer X | 03/05/19 |
| Group M | 01/21/19 |
| Florida Move A | 02/02/19 |
| Product B | 01/01/19 |
| Product C | 01/01/19 |
| Customer Y | 01/01/19 |
| Group N | 01/01/19 |
| Customer Z | 01/01/19 |
| Product D | 01/01/19 |
| Nebraska Move A | 01/01/19 |
| Product A | 01/01/19 |

FIG. 2

| Customer D | | Sort Filter |
|---|---|---|
| Employee A | | |
| Sequence: 1 | Origin | Destination |
| From: 43A | Vacated | Confirmed/Photo Taken |
| To: 143A | | |
| | | |
| Employee B | | |
| Sequence: 2 | Origin | Destination |
| From: 29D | Vacated | Confirmed/Photo Taken |
| To: 129D | | |
| | | |
| Employee C | | |
| Sequence: 3 | Origin | Destination |
| From: E98 | Vacated | Complete/Need Conf. |
| To: F98 | | |
| | | |
| Employee D | | |
| Sequence: 4 | Origin | Destination |
| From: Sect. 10 | Vacated | Pending |
| To: Sect. 15 | | |
| | | |
| Employee E | | |
| Sequence: 5 | Origin | Destination |
| From: Area 1 | Pending | ------ |
| To: Area 5 | | |

FIG. 3

| Employee S | | | | Origin ✓ |
|---|---|---|---|---|
| Info | Inventory | Checklist | Photos | Status |

| | |
|---|---|
| ID | 76399 |
| Sequence | 3 |
| Origin | 73A |
| Destination | 173A |
| Alias | |
| Name Plate | |
| Comments | |
| Office Type | |
| Action | |
| Phone | |
| Requestor | |
| Fax Lines | |
| # Computers | 0 |
| # Monitors | 0 |
| Current Office Lock | |
| Lock Service | |
| CATV Satellite | |
| Analog Lines | |
| Direct Internet Tap | |
| Ergonomic Furniture | |
| Subscriptions | |
| Security Concerns | |

FIG. 4A

| Employee S | ← | → | Origin ✓ |
|---|---|---|---|
| Info | Inventory | Checklist | Photos | Status |

| | | | |
|---|---|---|---|
| CPU | [-] 0 [+] | _____ |
| Monitors | [-] 0 [+] | _____ |
| Keyboard Bag | [-] 0 [+] | _____ |
| Docking Station | [-] 0 [+] | _____ |
| Chair | [-] 0 [+] | _____ |
| Crates | [-] 0 [+] | _____ |
| Gondolas | [-] 0 [+] | _____ |
| Printer | [-] 0 [+] | _____ |
| Folding Tables | [-] 0 [+] | _____ |
| Others | [-] 0 [+] | _____ |
| Boxes | [-] 0 [+] | _____ |
| Metal Shelves | [-] 0 [+] | _____ |
| Filing Cabinets/Metal | [-] 0 [+] | _____ |
| Lateral Cabinet | [-] 0 [+] | _____ |

FIG. 4B

| Employee S | ← → | Destination ✓ |
|---|---|---|
| Info  Inventory  Checklist | Photos | Status |

| | | | |
|---|---|---|---|
| CPU | X | 0 | ✓ |
| Monitors | X | 2 | ☑ |
| Keyboard Bag | X | 1 | ☑ |
| Docking Station | X | 1 | ☑ |
| Chair | X | 1 | ☑ |
| Crates | ☒ | 3 | ✓ |
| Notes | | _____ | |
| Gondolas | X | 0 | ✓ |
| Printer | X | 0 | ✓ |
| Folding Tables | X | 2 | ☑ |
| Others | X | 0 | ✓ |
| Boxes | X | 0 | ✓ |
| Metal Shelves | X | 0 | ✓ |
| Inventory Comments: | | _____ | |

FIG. 4C

| | | 505 |
|---|---|---|
| Employee ID | 76399 | |
| Sequence | 3 | |
| Origin | 73A | |
| Destination | 173A | |
| Phase ID | 2-Yellow | |
| Phase | 2 | |
Origin    510
Checklist
  Computer Disconnected
    Status               Vacated Origin
    Date/Time (UTC) 8/19/2018 3:21 PM
    User                Mover M
    Comments
Destination    515
Checklist
  Computer Disconnected
    Status               Confirmed/Photo Taken
    Date/Time (UTC) 8/23/2018 6:03 AM
    User                Mover T
    Comments
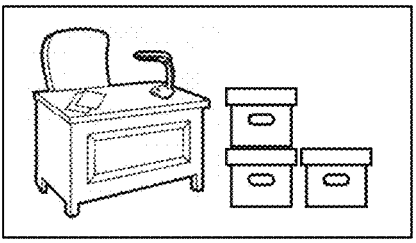
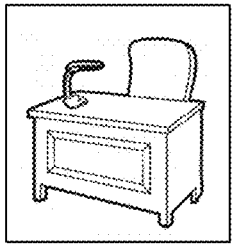
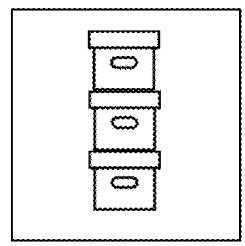
FIG. 5

| Inventory | | | | | |
|---|---|---|---|---|---|
| Inventory Type | Count | Counted By (Time) | Comments | Discrepancy | Disc. Recorder |
| CPU | 0 | | | | |
| Monitors | 2 | User A (9/23/18 7:12 AM) | | NO | User C (10/1/18 5:13PM) |
| Keyboard Bag | 1 | User B (9/23/18 10:31 AM) | | NO | User C (10/1/18 5:13PM) |
| Docking Station | 1 | User K (9/23/18 8:06 AM) | | NO | User E (10/1/18 5:58 PM) |
| Chair | 1 | User A (9/23/2018 7:12 AM) | | NO | User C (10/1/18 5:13PM) |
| Crates | 3 | User B (9/23/18 10:31 AM) | | NO | User C (10/1/18 5:13PM) |
| Lateral Cabinet | 0 | | | | |
| Gondolas | 0 | | | | |
| Printer | 0 | | | | |
| Folding Tables | 2 | User A (9/23/2018 7:12 AM) | | NO | User C (10/1/18 5:13PM) |
| Others | 0 | | | | |
| Boxes | 0 | | | | |
| Metal Shelves | 0 | | | | |

FIG. 6

Move List

[ Upload New Move Plan ]

| Description | Start Date | End Date | Edit Move | Delete Move | Generate Link | Link |
|---|---|---|---|---|---|---|
| Cust. 1 Matrix | 8/3/18 | 8/19/18 | 📝 | ✖ | ✖ | cu1ma3bo28 |
| Cust. 2 Phase A | 5/13/18 | 5/28/28 | 📝 | ✖ | 🔗 | |
| Cust. 2 Phase B | 5/27/18 | 6/12/18 | 📝 | ✖ | 🔗 | |
| Cust. 2 Phase C | 6/1/18 | 6/15/18 | 📝 | ✖ | ✖ | cu1phc92lef |
| Cust. 3 Matrix | 10/5/18 | 10/9/18 | 📝 | ✖ | 🔗 | |
| Cust. 4 Move 1 | 11/20/18 | 12/15/18 | 📝 | ✖ | 🔗 | |
| Cust. 1 Move 5 | 12/5/18 | 12/7/18 | 📝 | ✖ | 🔗 | |

FIG. 7

METHODS AND SYSTEMS TO TRACK RELOCATION STATUS

CROSS-REFERENCE TO RELATED APPLICATION

This application claims priority to and the full benefit of U.S. Provisional Patent Application Ser. No. 62/610,233 (filed Dec. 24, 2017, and titled "METHODS AND SYSTEMS TO TRACK RELOCATION STATUS"), the entire contents of which are incorporated here by reference.

BACKGROUND

Traditionally, companies relied purely on instinct, intuition, and experience to manage a commercial move. Companies would use one person on a job to corral teams in a uniform direction to determine what went where and when. Companies did not use labels, did not use pen or paper to take notes, and did not follow checklists for best practices or standards during a move. There were no organized steps to follow for where to start or how to carry out a move. There was no planning for how to be effective during a move, even when it involved hundreds of employees. Facility managers would patrol a move waiting for crew members to request help or give updates. When asked for a status update, supervisors would guess what an answer might be. Missing items would only be discovered days or weeks after a relocation and after employees complained that things were missing. Many companies still follow these practices, or lack thereof, today.

Meanwhile, some companies organized data for inventory or progress status on hard-copy forms or spreadsheets. As projects were completed, employees or contractors would follow these forms and update the forms at certain checkpoints in a project. This was wholly reliant on the employee or contractor being aware of the processes the company had in place for these projects, remembering to update the forms for the status of a project, and then returning whatever was completed to the company. Since efficiency is integral to the financial well-being, stability, or growth of many companies, some started developing more sophisticated methods for managing their inventory and statuses on projects.

Some companies began to use inventory management systems to track inventory levels, orders, sales, and deliveries. These systems may create work orders, assembly lists, production orders, bills of material, and other related documents. These inventory management systems may focus on increasing accuracy, reinforcing what the priorities are for an employee, and streamlining the system as a whole.

Customarily, a simplified version of the relocation process required an initial set-up; intense communication between relocation teams and management, both in the relocation company and with the corporate customer; and a final walkthrough to make sure everything was properly moved and not damaged. In between these steps, the relocation company needed to have a plan of action for how to implement the relocation, communicate this plan to the customer, have processes in place for those working on the plan to follow it, and ensure everything was being followed every step of the way. Even if implemented properly, customers would have to rely on management or be on-site for updates on progress to relocation. Minute details would often be overlooked for generalizations about the status of a relocation. For example, a company might not know exactly if every item for a particular employee had been moved yet if there were 900 employees being moved that day. These concerns could be exacerbated with larger relocations.

Even with the integration of limited inventory management systems, the industry norm remains highly dependent on self-reporting and pen and paper, which in turn creates inefficiencies and redundancies throughout the relocation process. Further, the redundancies often require manual creation and population of forms and spreadsheets, increasing the risk for errors. The manual nature of the relocation process makes it difficult, if not impossible, to effectively track the status of a move.

Current solutions on the market do not identify the supply chain of a move during a move, nor do they segment portions of a move in real-time for a customer to access on demand. Users are not able to make requests in real-time and see that request be resolved downstream during an actual relocation. Typically, customers have to wait until the relocation process is complete before sorting through what happened and following up with the mover with any concerns they may have. On top of that, current solutions are typically not used throughout the entire relocation process, including in the field during a move, and both before and after a move is finished. On a broader scale, relocation companies may integrate basic inventory management systems to try to capture some of the moving parts during a relocation.

SUMMARY OF THE DISCLOSURE

When there are various moving parts, more complex systems need to be integrated to make sure nothing falls through, particularly when there are hundreds of employees being moved from one location to another. What is needed is a method and system that brings transparency to the process, progress, and quality control to a commercial move during an actual, live relocation. This method and system may efficiently input information and receive status updates on every aspect of a relocation or move. This may include minute to larger details, from each item an employee has requested to move to status updates on specific sections of a move, such as whether the entire marketing department has been moved yet. This method and system may take requests or inputs made and move it through the system. For example, the system may facilitate a move request and push it forward into the actual execution of the move, such as making anyone doing a move aware of the protocol a company requires during its moves.

This system may reduce the number of personnel needed on a move that is normally used to help manage the move process. This system may provide visibility and transparency to every aspect of a relocation by allowing authorized users to track cargo and status from origin to destination. The system may also digitally capture pivotal aspects of a move that can be reviewed by all relevant or required parties at the beginning, during, and after a move. By providing this visibility and tiered access to information in real-time, corporate customers may be able to maintain business continuity and reduce the downtime that normally occurs after a move takes place. In some implementations, a coding system may be used to eliminate lost or misplaced items during a move.

In some embodiments, the system may provide an optimal relocation guide for users or managers, letting them know what the order of relocating could be. For example, management may be informed of what spaces are ready, which may be pushed to a user instead of the user seeking out a manager to be told what to do. In some implementations, this could be set by the system itself or based on a customer's request. Besides being accessible to those providing relocation services, the customer may also have access at any time so that they can see and receive status updates in real-time for how a relocation is progressing. Customers may also provide feedback during a move, addressing any questions a user might have during the process. Managers may also implement and handle a move remote by using the system.

In some implementations, a move or relocation may occur without the need for a war room. For example, the system may replace the traditional function of a war room by generating and reacting to relocation actions in real-time. Once enough moves have been done, the system may learn best practices, each user's productivity and capabilities, and create action plans according to this information. In some aspects, with proper training, a user may use the system to help a move when they decide to. For example, a potential user may access the system, be told to go to a site, work the move, and then return to whatever they were doing when they are done. Another user may then come in and continue the former user's tasks since the system would keep track of what the prior user had accomplished. This may make it easier for managers on-site who may have a different stream of users on a given day and did not keep track of what each individual person accomplished for the move.

A system of one or more computers may be configured to perform particular operations or actions by virtue of having software, firmware, hardware, or a combination of them installed on the system that in operation may cause the system to perform the actions. One or more computer programs may be configured to perform particular operations or actions by virtue of including instructions that, when executed by data processing apparatus, may cause the apparatus to perform the actions. In some aspects, corresponding computer systems, apparatus, and computer programs recorded on one or more computer storage devices, may be configured to perform the actions of the methods.

In some aspects, a relocation tracking system may comprise a first local computing device generating network access requests for a relocation tracking, one or more memory resources, a remote server coupled to the first local computing device, the one or more memory resources, and an internet computer network. In some embodiments, the memory resources may comprise a customer profile database may comprise a plurality of customer profiles. In some implementations, the memory resources may comprise a visualization database may comprise a plurality of progress visualization types.

In some embodiments, the remote server may be configured to receive a first move plan, comprising at least a first origin, a first destination, a move date, a first customer profile, and an estimated inventory; receive a first progress formula, wherein the first progress formula is based at least in part on the first move plan; receive a first set of predefined move parameters related to an execution of the first move plan; monitor the first set of predefined move parameters, wherein a monitoring is stored as monitored predefine move parameters; translate monitored predefined move parameters to move execution data; apply the move execution data to the first progress formula; assign a first set of execution values to the move execution data, wherein the first set of execution values is based on an application of the move execution data to the first progress formula; differentiate between completed execution values and pending execution values within the first set of execution values; compare the completed execution values to pending execution values; and generate a first progress visualization based on a comparison of the completed execution values to pending execution values.

Implementations may comprise one or more of the following features. In some aspects, the first progress formula may be based at least in part on one or more the customer profile, the first move plan, and the first set of predefined move parameters. In some embodiments, the first move plan may comprise a plurality of move segments, and wherein the first progress formula may be based at least in part on the plurality of move segments. In some embodiments, the remote server may be further configured to associate the move execution data with the plurality of move segments, and wherein the first set of execution values may be organized by move segments. In some aspects, comparing the completed execution values to pending execution values may occur by move segment, wherein the completed execution values and pending execution values of each move segment may be compared. In some implementations, the first progress visualization may be further based on completion of each move segment.

In some embodiments, the monitoring may occur a plurality of times, and the remote server may be further configured to translate monitored predefined move parameters to updated move execution data; assign a second set of execution values to the updated move execution data; wherein the second set of execution values may be based on the application of the updated move execution data to the first progress formula; differentiate between completed execution values and pending execution values within the second set of execution values; compare the completed execution values to pending execution values from the second set of execution values; and generate a second progress visualization based on the comparison of the completed execution values to pending execution values from the second set of execution values.

In some implementations, the updated move execution data may adjust in real time based on one or more changes in one or more the first move plan, the first set of predefined move parameters, and the first progress formula. In some embodiments, the visualization database may further comprise a plurality of interface types, wherein the interface types comprise at least one progress visualization, and the remote server may be further configured to provide a first interface with the first progress visualization to a second local computing device, wherein the remote server may be couplable to the second local computing device. In some aspects, the first interface may be customizable based at least in part on the first customer profile. Implementations of the described techniques may comprise hardware, a method or process, or computer software on a computer-accessible medium.

In some aspects, corresponding computer systems, apparatus, and computer programs recorded on one or more computer storage devices, may be configured to perform the actions of the methods. In some aspects, a method for relocation tracking may comprise the method steps of receiving a first move plan comprising at least a first origin, a first destination, a move date, a first customer profile, and an estimated inventory; receiving a first progress formula, wherein the first progress formula may be based at least in part on the first move plan; receiving a first set of predefined move parameters related to an execution of the first move plan; monitoring the first set of predefined move parameters, wherein a monitoring may be stored as monitored predefine move parameters; translating monitored predefined move parameters to move execution data; applying the move execution data to the first progress formula; assigning a first set of execution values to the move execution data, wherein the first set of execution values may be based on an application of the move execution data to the first progress formula; differentiating between completed execution values and pending execution values within the first set of execution values; comparing the completed execution values to pending execution values; and generating a first progress visualization based on a comparison of the completed execution values to pending execution values.

Implementations may comprise one or more of the following features. In some aspects, the first progress formula may be based at least in part on one or more the customer profile, the first move plan, and the first set of predefined move parameters. In some embodiments, the first move plan may comprise a plurality of move segments, wherein the first progress formula may be based at least in part on the plurality of move segments. In some implementations, the method further may comprise associating the move execution data with the plurality of move segments, wherein the first set of execution values may be organized by move segments. In some aspects, comparing the completed execution values to pending execution values may occur by move segment, wherein the completed execution values and pending execution values of each move segment may be compared.

In some implementations, the first progress visualization may be further based on completion of each move segment. In some embodiments, the monitoring may occur a plurality of times, and the method may further comprise translating monitored predefined move parameters to updated move execution data; assigning a second set of execution values to the updated move execution data; wherein the second set of execution values is based on the application of the updated move execution data to the first progress formula; differentiating between completed execution values and pending execution values within the second set of execution values; comparing the completed execution values to pending execution values from the second set of execution values; and generating a second progress visualization based on the comparison of the completed execution values to pending execution values from the second set of execution values.

In some aspects, the updated move execution data may adjust in real time based on one or more changes in one or more the first move plan, the first set of predefined move parameters, and the first progress formula. In some embodiments, method may comprise providing a first interface with the first progress visualization. In some implementations, the first interface may be customizable based at least in part on the first customer profile. Implementations of the described techniques may comprise hardware, a method or process, or computer software on a computer-accessible medium.

BRIEF DESCRIPTION OF THE DRAWINGS

The accompanying drawings that are incorporated in and constitute a part of this specification illustrate several embodiments of the disclosure and, together with the description, serve to explain the principles of the disclosure:

FIG. 2 illustrates an exemplary graphical user interface ("GUI") of a mobile relocation tracking system, according to some embodiments of the present disclosure.

FIG. 3 illustrates an exemplary GUI of a mobile relocation tracking system, according to some embodiments of the present disclosure.

FIG. 4A illustrates an exemplary GUI of an employee profile, according to some embodiments of the present disclosure.

FIG. 4B illustrates an exemplary GUI of an employee profile, according to some embodiments of the present disclosure.

FIG. 4C illustrates an exemplary GUI of an employee profile, according to some embodiments of the present disclosure.

FIG. 5 illustrates an exemplary GUI of a documentation page, according to some embodiments of the present disclosure.

FIG. 6 illustrates apparatus that may be used to implement aspects of the present disclosure including executable software, according to some embodiments of the present disclosure.

FIG. 7 illustrates an exemplary GUI of a relocation matrix, according to some embodiments of the present disclosure.

DETAILED DESCRIPTION

Figure 1A:
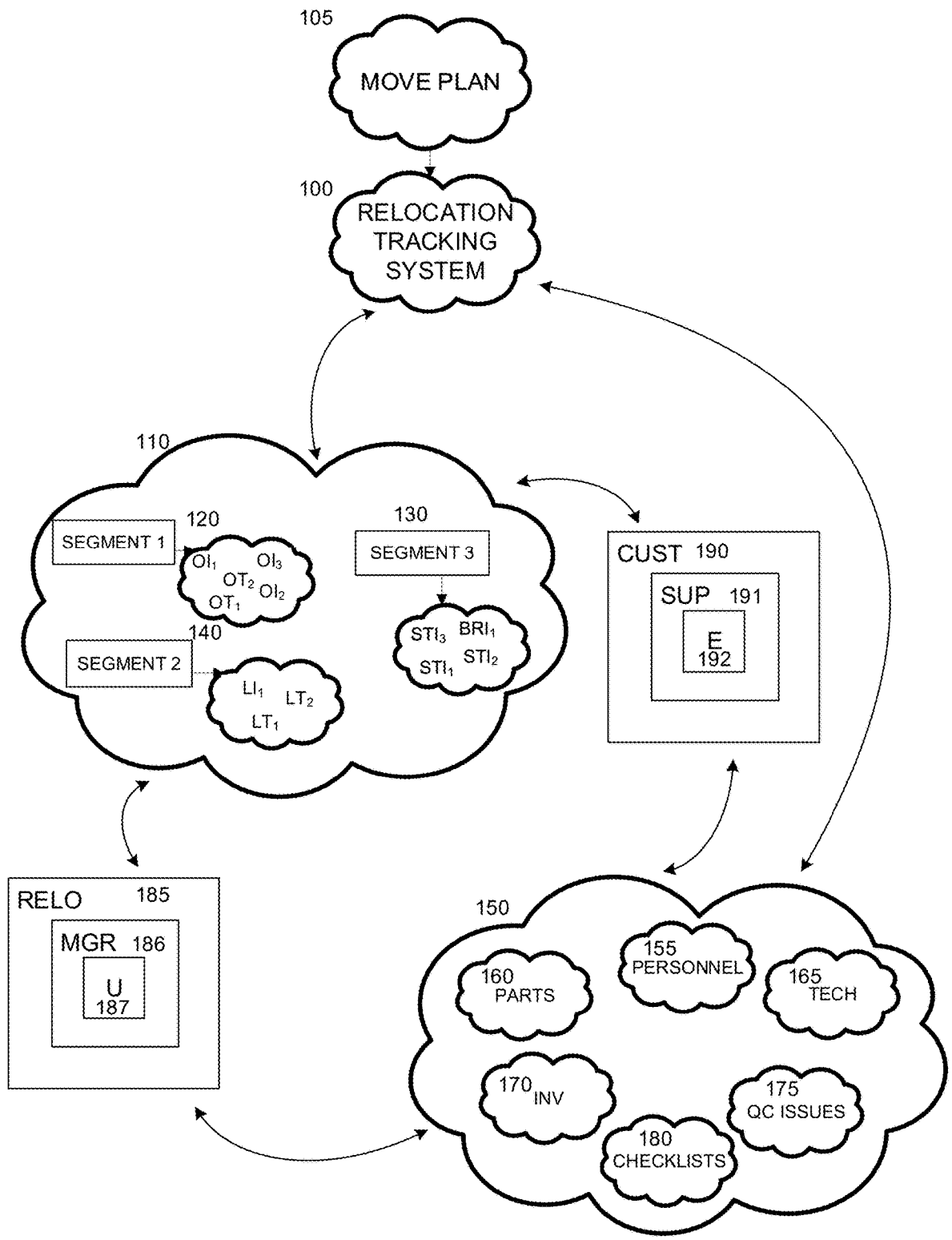
FIG. 1A illustrates an exemplary data block diagram for a relocation tracking system, according to some embodiments of the present disclosure.

The present disclosure provides generally for methods and systems relating to relocation management. According to the present disclosure, several users may have access to the system, including employees or contractors performing relocation services, customers interested in seeing how the relocation process is progressing, and management who may not be on-site but would like to see that there is steady progress on the relocation. While each type of user may have access to the system, there may be different authorizations for what functions each user may perform.

In the following sections, detailed descriptions of examples and methods of the disclosure will be given. The description of both preferred and alternative examples, though thorough, are exemplary only, and it is understood to those skilled in the art that variations, modifications, and alterations may be apparent. It is therefore to be understood that the examples do not limit the broadness of the aspects of the underlying disclosure as defined by the claims.

Glossary

User: as used herein refers to those who are directly servicing a move for a customer on behalf of a relocator. A user may include anyone with access to the system for purposes of initiating, servicing, continuing, documenting, or finishing a move. As nonlimiting examples, a user may be a mover responsible for moving inventory from one location to another or a technology specialist responsible for breaking down and setting up technology for the customer.

Manager: as used herein refers to anyone with an oversight role within the relocator. Hierarchically speaking, a manager may have oversight on the individual users servicing a move. Historically, a manager may coordinate with each user to ensure that everything was being done properly during a move.

Supervisor: as used herein refers to anyone with an oversight role within the customer's company. This may include department heads, department managers, or CEOs, as nonlimiting examples.

Employee: as used herein refers to anyone who works at customer's company. This may include those who are being relocated.

Customer: as used herein refers to an entity that may hire a relocator.

Relocator: as used herein refers to an entity that may perform a relocation. In some aspects, a relocator may provide services beyond simple transportation of inventory, such as set up and break down of technology for the customer.

Relocation: as used herein refers to a logistics project, wherein the project may comprise one or more of transportation, construction, technical support, destruction, labor coordination, or repair, as non-limiting examples. In some embodiments, a relocation may comprise moving a business from an origin to a destination. In some aspects, a relocation may comprise a combination of logistics and other services. For example, a construction project may involve moving material to and from a construction site, and it may further involve organizing the action items necessary to complete the construction project, wherein a progress formula may allow for the tracking of a complex project.

Identifier: as used herein refers to a mechanism or device that may be used to identify a particular inventory item, which may include an individual piece, a box of goods, or a component, as non-limiting examples. In some embodiments, an identifier may be used to associate inventory with a particular employee, department, or move area. For example, an identifier may comprise one or more of matrix barcodes, radio-frequency identification devices, or near field communication devices, as non-limiting examples.

Move Segment: as used herein refers to a definable portion of a move plan. In some aspects, a move segment may comprise multiple actions and center on a primary action item or action goal, such as relocating furniture or installing computers.

Move Plan: as used herein refers to an estimated relocation schedule. In some embodiments, a move plan may comprise a series of action items required to complete the relocation.

Progress Formula: as used herein refers to a formula that determines the progress of a relocation project based on a move plan. In some embodiments, the progress formula may be based on execution values associated with move segments within the move plan. In some aspects, the progress formula may adjust based on changes of the move plan, such as before execution, during execution, or combinations thereof. In some implementations, the progress formula may differentiate between completed execution values and pending execution values, wherein progress is based on a comparison of completed execution values and pending execution values. In some embodiments, one or more progress formula and execution values may be based at least in part on data collected on prior executed moves. In some aspects, a predictive data set may be compiled and extracted from a history of executed moves, wherein the predictive data set may inform one or more the progress formula and execution values.

Execution Value: as used herein refers to a relative impact on progress of a move plan. In some embodiments, a higher execution value indicates a higher impact on the progress. Overall, the combination of execution values of all of the move segments would indicate a completion of the move plan. In some aspects, move segments may be broken down further, wherein portions within each move segment may be assigned a portion of the execution value of the move segment. This further breakdown may be useful where a customer may want to track partial progress of move segments. In some aspects, completed execution values may be differentiated from pending execution values, wherein the completed execution values may be associated with completed portions of the move and the pending execution values may be associated with portions not yet completed.

The present disclosure relates generally to a system and methods for tracking the progress of larger scale relocations. More specifically, the disclosure describes a system for capturing information at each step of a relocation, from onboarding, preparation, prioritization, progress, to completion. In some embodiments, multiple parties may access the system to obtain information about various aspects of a move. In some implementations, multiple parties may communicate with each other as a move is happening to make changes as needed. In some aspects, someone may review progress in real-time or after to see exactly what was done, either in a zoomed out macro view or individually focused on minute details of a move.

Referring now to FIG. 1A, an exemplary data block diagram for a relocation tracking system 100 is illustrated. In some aspects, a move plan 105 may be entered into a relocation tracking system 100, which may include the information necessary to complete the move. In some embodiments, the information may include customer information, inventory, move parts, customer preferences, origin details, destination details, employee information, or other relevant information, as nonlimiting examples. In some implementations, customer preferences may include tracking preferences, wherein a customer may want to be able to view specific trackable milestones.

In some embodiments, the move plan 105 may guide the move execution 110, and move execution 110 data may be transmitted to the relocation tracking system 100. In some implementations, the move plan 105 may be broken into move segments. In some aspects, move execution 110 data may be transmitted in real time, such as where users 187 may have access to a network. In some embodiments, move execution 110 data may be periodically transmitted based on access to a network. In some implementations, move execution 110 data may be monitored and tracked in a manner and logic based on a move plan.

In some embodiments, move execution 110 may be broken down by move segments 120, 130, 140. As an illustrative example, a move may be broken down into three move segments 120, 130, 140, wherein offices may be moved first, then laboratory equipment, then breakrooms and storage. Both the office move segment 120 and the lab move segment 130 may require tech users to break down and set up technology for the move.

In some aspects, users 187, managers 186, employees 192, and supervisors 191 may have limited access to move execution 110 data and may interface with segments of a move they may be responsible for. For example, an employee 192 may be able to input information related to the first move segment 120 of the move, which may move the employee's 192 office. In some embodiments, the customer 190 and the relocator 185 may be able to view all of the move execution 110 data and may be limited in the ability to modify some of the granular data, which may reduce the risk of non-users improperly modifying information they may not be directly involved with.

In some aspects, the move execution 110 data may be transmitted back to the relocation tracking system 100, which may translate the move execution 110 data into status 150 data. In some implementations, status 150 data may be reorganized into a range of categories, such as personnel 155, move segments 160, technology 165, inventory 170, quality control issue 175, and checklists 180, as nonlimiting examples. The reorganization of move execution 110 data may be based in part on customer 190 or relocator 185 preferences. For example, a customer 190 may provide checklists 180 for moves that may be developed internally for quality control. As another example, a relocator 185 may prefer to reorganize the move execution 110 data in a manner that may allow for comparison of moves between different moves and customers.

Figure 8:
FIG. 8 illustrates an exemplary GUI of an external customer status visualization, according to some embodiments of the present disclosure.

In some aspects, the move execution 110 data may be reorganized into visualizations, such as illustrated in FIG. 8. In some embodiments, move execution 110 data may be reorganized by data types, such as images, as illustrated in FIG. 5. In some implementations, move execution 110 data may be organized by personnel, wherein a customer 190 or supervisor 191 may be able to track move data related to a particular employee 192, team, or department, even over different moves. Similarly, move execution 110 data may be reorganized by user 187, which may allow a manager 186 or relocator 185 to monitor and track the effectiveness and efficiency of particular users, teams, or departments.

In some implementations, a pulse survey may be generated by the system throughout the move process and after. In some aspects, this pulse survey may be sent to users, supervisors, managers, or employees to complete at various check points throughout the move. In some embodiments, a pulse survey may allow one or both the relocator or the customer to collect objective and subjective data throughout the move. In some implementations, the pulse survey may request subjective responses, such as "how do you feel about the move so far?" or "how do you feel about the efficiency of the move?," wherein the response may comprise text, imagery, emojis, or combinations thereof.

In some aspects, users may note recurring issues that are occurring during the move, which may be pushed through the system and brought to other users' and managers' attentions. By way of an example, a user may note that they have encountered numerous areas where cables have not been properly bagged. This may prompt a task by the system for the team responsible for that to check all cables again. This may also be brought to a manager's attention to then determine what to do about the issue.

Figure 1B:
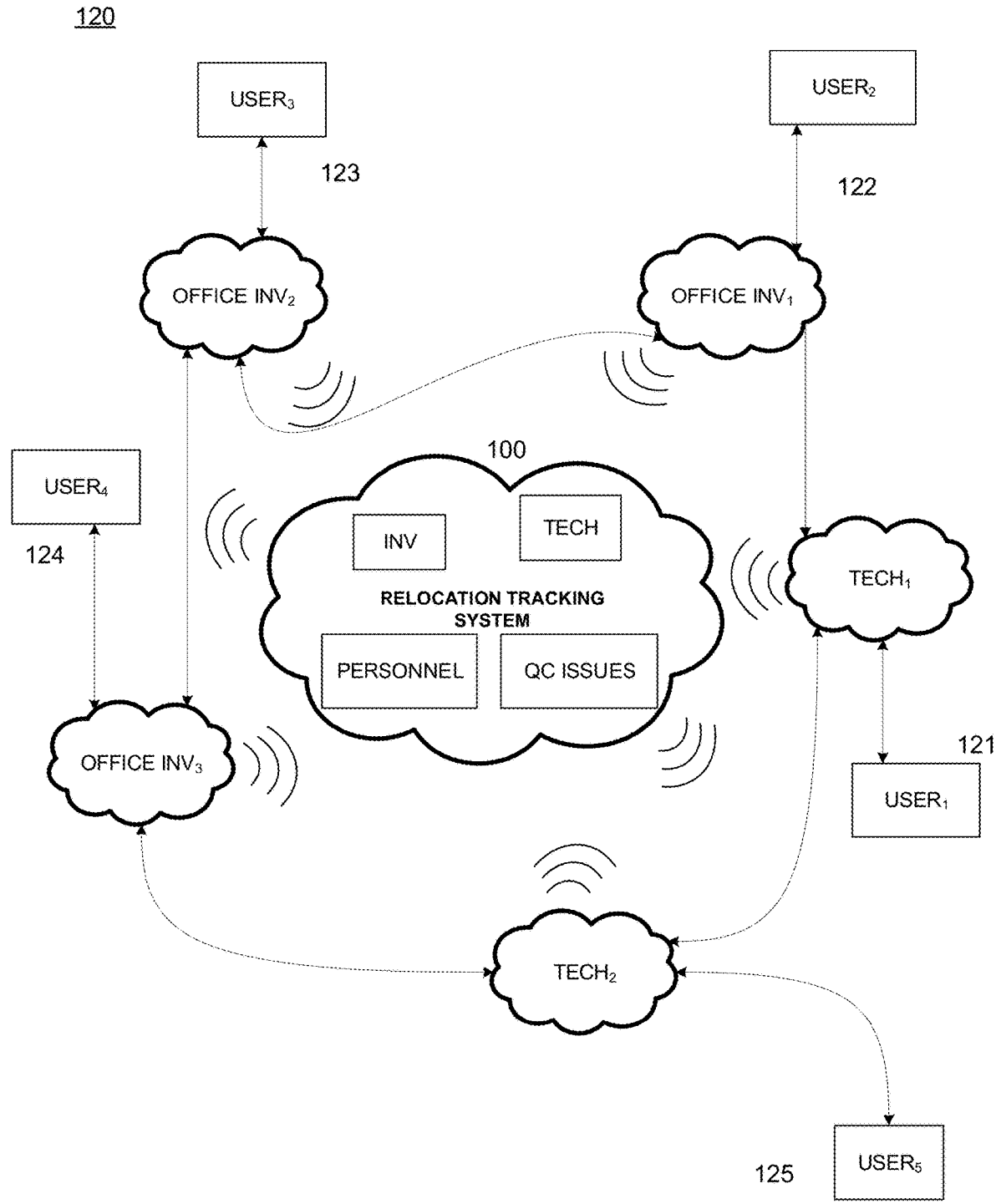
FIG. 1B illustrates an exemplary data block diagram relocation tracking system for a portion of a move, according to some embodiments of the present disclosure.

Referring now to FIG. 1B, an exemplary data block diagram relocation tracking system 100 for a move segment 120 of a move is illustrated. In some aspects, users 121-125 may input move execution data into the relocation tracking system 100. In some embodiments, at least some of the transmission of data may be wireless through a network. As an illustrative example, a first user 121 may break down the technology for a particular office section at the origin, three users 122-124 may be responsible for moving office inventory, and a fifth user 125 may be responsible for setting up the technology at the destination.

In some aspects, the relocation tracking system 100 may receive and store the move execution data. In some embodiments, the relocation tracking system 100 may store the move execution data as received, wherein the organization may be based on the move plan. In some implementations, the relocation tracking system 100 may store the move execution data utilizing different logic and organization. In some embodiments, the relocation tracking system 100 may store the move execution data in an indexed manner that may allow for reorganization and presentation of data based on the preferences of the entity accessing the data.

Referring now to FIG. 2, an exemplary graphical user interface (GUI) of a mobile relocation tracking system is illustrated. In some embodiments, a user may select a move from a list. In some implementations, a list may be described in order of priority or from date of service. In some aspects, a list may be color coded to reflect what type of move is happening or where in the process the move is. For example, the list may have a blue bar for moves at a place of origin, an orange bar for a move in progress, a yellow bar for a move at a destination, and a green bar for a completed move. In some embodiments, users may have access to moves they have been assigned.

In some embodiments, users may have limited access based on the portion of the move they may be responsible for. For example, a user may be able to input information for portions of the move they may be directly involved with and may have view-only access for the other parts of the move. In some aspects, portions of the move may require security clearance or confidentiality agreements, wherein only users with the appropriate access may be able to view that portion of the move. In some embodiments, user access may be separated by move segments. In some implementations, users may receive assignments through the mobile relocation tracking system. For example, a user may use a mobile device to see where they need to be on a particular day to provide relocation services.

Referring now to FIG. 3, an exemplary graphical user interface (GUI) of a mobile relocation tracking system is illustrated. In some embodiments, a user may sort information by name of employee, origin status, or destination status. In some implementations, a user may enter information they are searching for the system to populate. For example, a user may start to type "John" and the system will suggest employees named John with varying last names. In some aspects, a user may scan a matrix barcode to pull an employee's records.

Referring now to FIG. 4A, an exemplary graphical user interface (GUI) of an employee profile is illustrated. In some embodiments, a user may click on an employee's name for more information about them. In some implementations, a user may scan a matrix barcode to access this information. In some aspects, an information tab may include an employee's name; information about the employee, such as what office they previous had and what office they are moving to; what items the employee has to move; any special instructions for the relocation. In some embodiments, the system may interface with the customer system, which may allow for cross referencing between move information and employee data.

Referring now to FIG. 4B, an exemplary graphical user interface (GUI) of an employee profile is illustrated. In some embodiments, a user may update information about an employee's inventory. In some implementations, this may include objects to be documented for a move. In some implementations, a user may receive a unique code, such as a QR code, to confirm the user is authorized to access and alter a profile. In some aspects, this may include computers, monitors, keyboards, keyboard bags, docking stations, chairs, crates, printers, boxes, as nonlimiting examples. In some embodiments, a user may increase the quantity as they document the items. In some implementations, a user may take a photograph that may identify the item. In some aspects, the system may identify items based on photographs taken. In some embodiments, the system may identify items in a room based on a user's photograph of a space. In some implementations, the system may identify items based on user photographs upon which the user swipes to confirm whether the identification is correct.

In some aspects, a user may add commentary for each inventory item. For example, a user may write where an item is cracked and refer to the documentation for more information. In some embodiments, a user may write a summation or commentary about the employee's inventory. For example, a user may write that an employee failed to attached tags or matrix barcodes to their items, meaning the user was unable to touch or move those items as required by protocol.

In some implementations, a user, manager, or supervisor may create a custom checklist for a move. For example, an employee may require that their computer by disconnected before that item can be moved. In some aspects, a checklist may be assigned for origin, destination, or both. In some embodiments, a checklist may be generated and pushed by a manager or supervisor during a job. For example, a company may have certain protocols or quality controls that need to be followed during a relocation and push that out to users as they start preparing to move items.

In some implementations, a manager may upload an inventory template for a user to follow during a move. In some embodiments, a supervisor or manager may add new employees prior to and during a move. In some aspects, the system may prevent a supervisor or manager from adding an employee if a move has already been completed. In some implementations, a supervisor or manager may create a custom inventory template for an employee, department, or move. In some embodiments, a supervisor or manager may name items, organize how they are displayed by priority, or list them alphanumerically, as nonlimiting examples.

In some aspects, a user may have access to a camera to document a move. In some embodiments, a user may photograph or video items at origin and at destination. In some implementations, the system may tie this media, such as photographs or videos, to an employee. In some aspects, an employee may mark items with a unique identifier for the system to identify and tag. In some embodiments, photographs may be added to a photograph stream within the system. In some implementations, an employee may have his or her own photograph stream. In some aspects, a user may document a move through video or body cameras, as non-limiting examples.

In some aspects, a department may have its own media stream. In some embodiments, a manager, supervisor, employee, or other user may access the media stream to see the condition of an item. In some implementations, a manager, supervisor, employee, or other user may see a status update for an individual item. In some aspects, a manager, supervisor, employee, or other user may see a status update for an entire move segment. In some embodiments, a manager, supervisor, employee, or other user may add commentary to a photograph.

In some implementations, a user may mark a photograph as being taken at a point of origin or a point of destination. In some aspects, the system may use geolocation on a user's device to identify their location. In some embodiments, the system may match geolocation data to a photograph taken and categorize a photograph accordingly.

In some implementations, a manager, supervisor, or user may record a status throughout a move. In some aspects, a manager, supervisor, or user may update status through a move. For example, a user may indicate that an employee is ready to move, is not ready to move, or indicate whether items had been moved from the origin location.

Referring now to FIG. 4C, an exemplary graphical user interface (GUI) of an employee profile is illustrated. In some embodiments, a user may choose between origin or destination interfaces. In some implementations, the system may carry over information input at origin to confirm at destination. In some aspects, a user may confirm any inventory they put in at origin at a place of destination. In some embodiments, a user may input a note if there is any discrepancy between any items from point of origin to point of destination.

In some implementations, a user may document inventory at the point of destination. In some aspects, the system may scan the item and compare the item from point of origin to point of destination. In some embodiments, the system may indicate whether there are any differences in the item from point of origin to point or destination. For example, the system may put in a note for a user to check whether a monitor was chipped from point of origin to point of destination. In some implementations, a user may write a note if any items are missing. In some aspects, the system may flag this for a manager, who may push out a notification to other users to make sure an item did not end up in the wrong place. In some aspects, a manager may receive a notification that a manager or user is looking for a missing or misplaced item. In some embodiments, the system may collect a list of discrepancies for users to do a final check before completing a move.

Referring now to FIG. 5, an exemplary graphical user interface (GUI) of a documentation page is illustrated. In some embodiments, an information section 505 may display information about an employee. In some implementations, this may include move instructions, move order, special instructions, and sequence numbers, as nonlimiting examples. In some aspects, an origin section 510 may display a checklist to follow during an initial move, the current status of a move for an employee, and information on who is moving that employee.

In some embodiments, the origin section 510 may display documentation, such as photographs, as they are taken during the move process. In some implementations, a destination section 515 may display a checklist to follow during delivery or set-up at a destination, the current status for an employee, and information on who is moving that employee. In some aspects, a destination section 515 may display documentation, such as photographs, as items are delivered at a destination.

Referring now to FIG. 6, an exemplary graphical user interface (GUI) of an inventory page is illustrated. In some embodiments, a user, supervisor, or manager may see detailed inventory information for an employee. In some implementations, this may include additional information a user captured during a move. In some aspects, this may include questions a manager or supervisor has for an employee item. For example, an employee may ask a supervisor to check whether a particular item was found during a move, which may have prompt a user to add said item to this list.

In some embodiments, a user may document all employee items. In some implementations, a user may include notes about the status of each item. For example, a user may note whether there were any boxes in employee's space during the move. By way of another example, a user may note that an item was not moved because it was not properly tagged or marked for a move. In some aspects, the system may scan documentation to identify an employee's items on a user's behalf. For example, a user may take a photograph of a room. The system may scan the photograph for certain items, such as computers, monitors, and chairs. The system may present a list to user to confirm whether it has properly captured these items. In some embodiments, the inventory page may include the user who worked on that task or employee. In some implementations, the system can track the continuity between who initiated a move for that employee and who did final checks or quality control.

Referring now to FIG. 7, an exemplary graphical user interface (GUI) of a relocation matrix is illustrated. In some embodiments, a user, supervisor, or manager may create a relocation matrix. In some implementations, a user, supervisor, or manager may supply employee names, item descriptions, points of origin and destination, special instructions, phase identification numbers, sequence numbers, as nonlimiting examples. In some aspects, the system may generate some of the information if there is a repeat customer. In some embodiments, the system may generate some of the information based on customer protocols. In some implementations, the system may generate some of the information based on what is supplied. For example, the system may note that all employees listed are in the same office space and may group them together in a sequence or phase of the move. In some aspects, a user, supervisor, or manager may supply a start or end date for a move.

In some embodiments, the system may generate a unique uniform resource locator (URL) for a relocation matrix. In some implementations, the system may push this URL to customers, third parties, or users to track progress of a move. In some aspects, a customer may then begin to add information for the move. In some embodiments, this information may include employee names, item descriptions, special instructions, quality control protocols, priority employees, priority departments, or custom checklists, as nonlimiting examples.

Referring now to FIG. 8, an exemplary graphical user interface (GUI) of an external customer status visualization is illustrated. In some aspects, a customer may receive a unique URL to track the status of a move. In some implementations, this URL may be shared with others inside the organization. In some embodiments, a customer may have a limited progress visualization based on administrator permissions. In some implementations, a customer may see a progress bar indicating the status of a move. In some aspects, there may be a separate status bar for origin progress and destination progress.

In some implementations, the status bar may be based on predefined default characteristics, such as inventory. In some aspects, the customer or relocator may customize the criteria for the status bar, wherein progress of the status bar may be tied to characteristics that the customer may find relevant. For example, the status bar may be tied to quality control markers, wherein a move may not be considered complete where there are outstanding quality control issues. As another example, for some moves, the status bar may only increase in progress when full move segments of a move plan may be completed, and for some moves, the status bar may increase in real time as any portion of the move segment is progressing. In some embodiments, the status bar may be based on a progress formula, wherein each move segment may be assigned an execution value. The status may be based on a comparison of completed execution values and pending execution values.

In some embodiments, a customer may view information on individual employees, offices, or inventory. In some implementations, a customer may see what user is handling an aspect of a move. For example, a customer may see that a user is moving equipment from a medical laboratory.

In some aspects, a customer may manipulate the visualization to show relevant information for them. For example, a customer may only want to see sequence 1 move status. In some embodiments, a customer can request updates from the system when a particular action happens. For example, a customer may receive a notification each time a sequence has finished or a new move phase has started.

In some implementations, a customer may have administrative access to the external customer status visualization. In some aspects, a supervisor may have administrative access to the external customer status visualization. In some embodiments, a supervisor may configure a move from the external customer status visualization. In some implementations, a supervisor may add custom inventories or custom checklists, as nonlimiting examples. In some aspects, a supervisor can push whatever they create to be standard for the entire move. In some embodiments, a supervisor may push whatever they create for certain departments or segments of the move.

In some implementations, a customer may determine who gets access to the URL, the extent of their administrative privileges, what the standard visualization is for each person who accesses the URL, as nonlimiting examples. In some aspects, a customer may control how much access an employee has to their status information. In some embodiments, a customer may determine whether an employee can create their own checklist. In some implementations, a customer may enable a supervisor to make administrative or access decisions for each employee.

Figure 9:
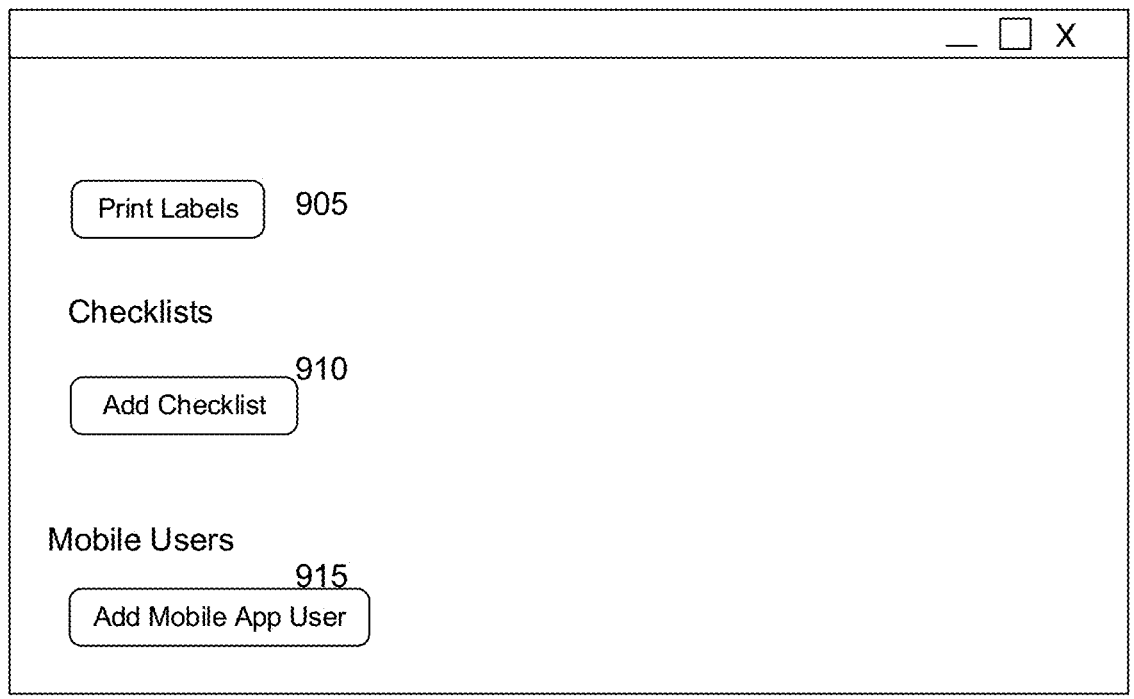
FIG. 9 illustrates an exemplary GUI of a partial administrative visualization, according to some embodiments of the present disclosure.

Referring now to FIG. 9, an exemplary graphical user interface (GUI) of a partial administrative visualization is illustrated. In some embodiments, a label generator 905 may be used by an employee, user, manager, or supervisor. In some implementations, the label generator 905 may automatically generate labels for any records or employees that are included in a relocation matrix. In some aspects, a supervisor may ask employees to generate their own labels. In some embodiments, the system may indicate that a move is not ready based on whether labels have been generated. In some implementations, the system may send reminders to print labels to employees, supervisors, or the company.

In some embodiments, radio-frequency identification (RFID) may be used by the system. In some implementations, matrix barcodes may be used by the system. In some aspects, beacons may be used by the system. In some embodiments, each of these may identify independent or individual information for the system. In some implementations, a room may be assigned an identifier, such as a matrix barcode. In some embodiments, identifiers with real time tracking capabilities may be attached to high value assets, such as expensive lab equipment, servers, artwork, or confidential inventory, as non-limiting examples.

In some aspects, employees may be assigned an identifier. For example, a customer may have equipment or a room they consider to be incredibly confidential. They may have protocols and controls in place for how a moving company may handle this equipment. The system may integrate these desires and apply a different identifier type to ensure that, though the items are still accounted for, the users follow a customer's guidelines with respect to those items. This may ensure the transparency the system provides while enabling customers to ensure that their confidential information is safe.

In some aspects, a checklist generator 910 may be used by a user, manager, employee, supervisor, relocator, or customer to implement for specific or general portions of the move. In some aspects, a user generator 915 may be used to add users for a move. In some embodiments, a manager may determine who to assign to a move. In some implementations, a customer or supervisor may request particular users. In some aspects, the system may assign users based on their availability or proximity to a move site.

In some implementations, a manager may elect to assign tasks based on status updates received from the system, wherein the manager may manually assign or the system may automatically assign user tasks. In some aspects, the status update may indicate which sections have been cleared for the move, and users within a predefined vicinity and with the appropriate access and move abilities may be assigned a new section when they complete a prior task. For example, a technical user who sets up computers may be assigned a nearby area when all the necessary wires and hardware have been delivered.

In some embodiments, a customer, supervisor, manager, or user may manage information about employees and offices. In some implementations, a customer, supervisor, manager, or user may add, edit, or delete records about offices or employees as appropriate. For example, a supervisor may determine that an employee previously scheduled for a move is either not moving anymore or is not ready for the move. The supervisor may access the system and delete that employee from the list to ensure that a user does not move them according to the previous relocation plan. In some aspects, the system may notify a manager or user that changes were made to a move list. In some embodiments, these changes may be collected in a change log. In some implementations, these changes may appear with user interface indicators to signify a change was made.

Figure 10:
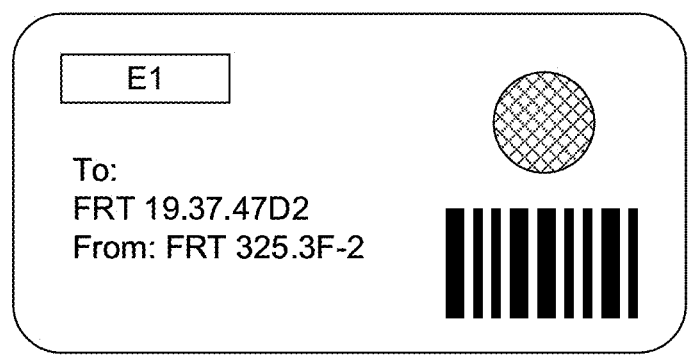
FIG. 10 illustrates an exemplary label, according to some embodiments of the present disclosure.

Referring now to FIG. 10, an exemplary label is illustrated. In some embodiments, a label may include a matrix barcode that a user may scan for more information. In some implementations, a matrix barcode may include employee information, sequence information, inventory information, phase information, origin information, or destination information, as nonlimiting examples. In some aspects, scanning a matrix barcode may prompt the display of miscellaneous information that may be relevant to a user. In some embodiments, a photograph taken of a matrix barcode may be uploaded into a photograph stream for other users, supervisors, managers, or employees to see. In some implementations, scanning a matrix barcode prompts a status or progress update on the progress bar screen.

In some aspects, a label may be color-coded. In some embodiments, this color may be generated by the system after it sorts out the order for a move. In some implementations, the labels may comprise one or both distinguishable shapes or patterns, which may allow for universal visual cues. Universal visual cues may not depend on language or color. In some implementations, a universal visual cue may allow for use unrelated to color, such as for color-blind persons or where printing in color is unavailable or impractical.

Figure 11A:
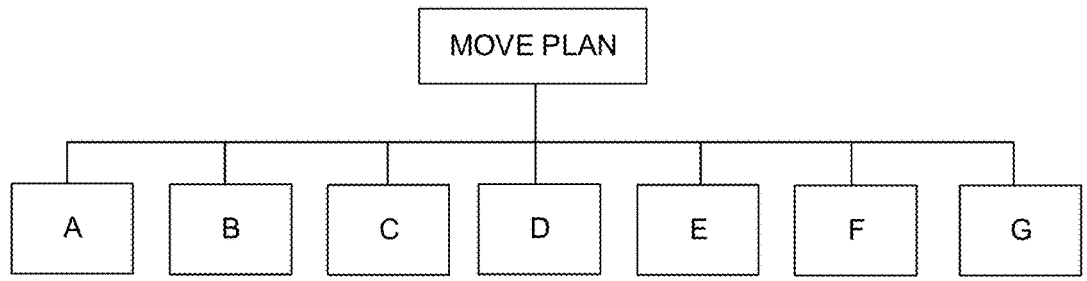
FIG. 11A illustrates an exemplary move plan, according to some embodiments of the present disclosure.

Referring now to FIG. 11A, an exemplary move plan is illustrated. In some embodiments, a move plan may be broken into multiple move segments. Each move segment may comprise at least one primary action type, such as moving, installing, breaking down, as non-limiting examples. In some embodiments, the primary action type may comprise the goal of the move segment. For example, the goal may be to transport a chair from origin to destination, wherein the actual execution may further comprise packing the chair for safe travel, loading/unloading a moving truck, and organizing the office to place the chair.

Figure 11B:
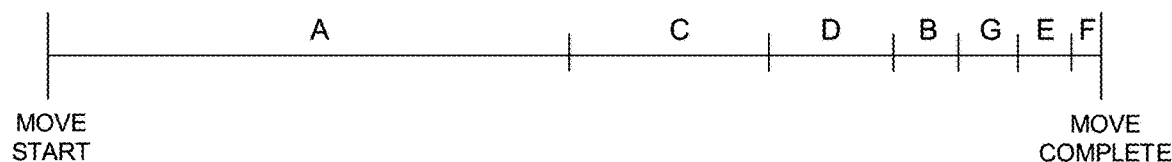
FIG. 11B illustrates a breakdown of an exemplary move plan by quantity of items per move segment, according to some embodiments of the present disclosure.

Referring now to FIG. 11B, a breakdown of an exemplary move plan by quantity of items per move segment is illustrated. In some embodiments, move segments may involve one or more items. As non-limiting examples, a move segment may comprise moving thirty cubicles, installing fifty computers, or deconstructing five pieces of equipment.

Figure 11C:
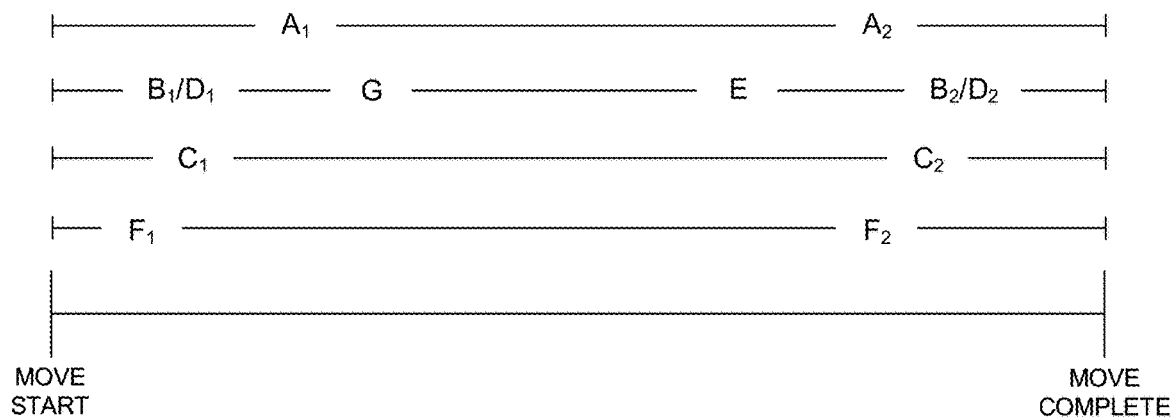
FIG. 11C illustrates a timeline breakdown of an exemplary move plan by move segment, according to some embodiments of the present disclosure.

Referring now to FIG. 11C, a timeline breakdown of an exemplary move plan by move segment is illustrated. In some embodiments, move segments may depend on the completion of another move segment. For example, moving computers may only be possible once the computers are broken down, and the technology may not be installed until the computers are delivered to the destination. As another example, the technology in a conference room may not be broken down until all the furniture has been removed.

In some aspects, a move segment may be independent of other move segments. As an illustrative example, relocating pallets may not depend on any other move segment. The pallets may be moved by a crew, equipment, and trucks dedicated to that move segment.

Figure 11D:
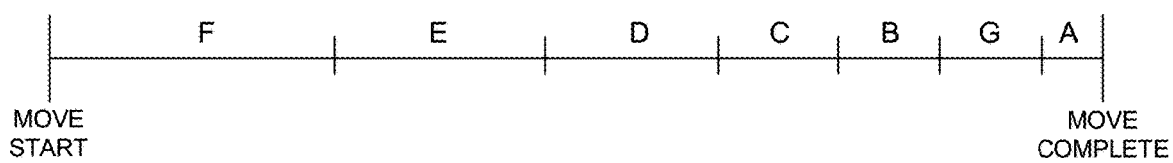
FIG. 11D illustrates a breakdown of relative execution values of move segments within an exemplary move plan, according to some embodiments of the present disclosure.

Referring now to FIG. 11D, a breakdown of relative execution values of move segments within an exemplary move plan are illustrated. In some aspects, an execution value of a move segment may indicate the impact of the move segment on the progress of the move plan, wherein a higher execution value correlates to a higher impact. In some embodiments, the execution value may be based on a range of factors, wherein quantity and timeline may be part of the calculation.

In some aspects, handling requirements may be factored into the execution value. In some implementations, an object may have specialized handling needs, such as specialized movers, specialized technicians, or movers with security clearance. Specialized personnel may have less availability, wherein scheduling may increase the execution value. In some aspects, specialized handling needs may increase the handling time. In some embodiments, handling requirements may include specialized move equipment. For example, equipment to move pallets may be standard compared to equipment necessary to move a large piece of sophisticated machinery. As another example, the move segment may comprise relocating confidential products, wherein the products must be wrapped and separated from nonconfidential products, and the movers may be required to have a level of security clearance.

In some embodiments, logistics requirements may be factored into the execution value. In some aspects, the time and effort it takes to execute a move segment may depend on logistics requirements, such as where the relevant items are located or transportation requirements, as non-limiting examples. In some embodiments, a building may comprise a small elevator that may not accommodate large items, such as furniture or equipment, which may force the use of stairs, increasing the execution value of move segments utilizing stairs. In some implementations, ease of access may affect the execution value.

For example, pallets in a warehouse may be more accessible than a large sculpture located on a third floor atrium. In some embodiments, the logistics may include parking issues. For example, a warehouse may have a loading dock with a separate parking lot, and an office building in the middle of a city may requirement separate parking permits. As another example, some move segments may only occur during a predefined date and time range, such as only at night or only on the weekends. Logistical limitations may increase the execution value of a move segment.

In some embodiments, the move segment may require a particular type of transportation vehicle. For example, a large sculpture, transportation vehicle, or large piece of equipment may only be transportable on a flatbed. Each may further have specialized requirements, such as height issues that may limit the driving route or escort requirements, as non-limiting examples. As another example, a move segment may require temperature control throughout the move, such as for perishable goods, for temperature-sensitive equipment, or transfer between extreme environmental conditions.

In some implementations, quality control requirements may be factored into the execution value. In some aspects, the quality control requirements may be standard or customized, such as by the customer, the manufacturer, the relocator, or regulations, as non-limiting examples. In some embodiments, completion of a move segment may only occur when target quality control thresholds have been met.

For example, a technical set up may only be complete once the computers have been turned on. As another example, relocation of a piece of special equipment may be considered complete only when the equipment is set up and runs effectively for a predefined period. As another example, the level of quality control may comprise verification from employees that they received their boxes or verification from a floor manager that they received the correct number of undamaged items. An increase in quality control standards may increase the execution value of a move segment.

As an illustrative example, the relocation may comprise a commercial move, where the customer may need to move from Orlando to Jacksonville. Generally, they may need to move equipment, conference rooms, office supplies, and leftover inventory from the warehouse. The move may be broken into segments. The segments may comprise: moving five hundred pallets (A); moving five conference room tables (B); moving fifty boxes of office supplies (C); moving twenty chairs (D); breaking down the technology in five conference rooms (E); moving a large piece of special equipment (F); and setting up technology in five conference rooms (G).

For illustrative purposes, the relocation may be broken down by move segment as illustrated in FIGS. 11A-11D. The five hundred pallets (A) may be located in a warehouse with easy access to a loading dock, wherein the five hundred pallets (A) may be the largest quantity but may be one of the simplest to move giving move segment A the lowest execution value. In contrast, moving a large piece of special equipment (F) may take specialized movers, a flatbed with escort, and special move equipment, wherein move segment F may be the most complex, labor intensive, and longest process, giving move segment F the highest execution value.

Figure 12:
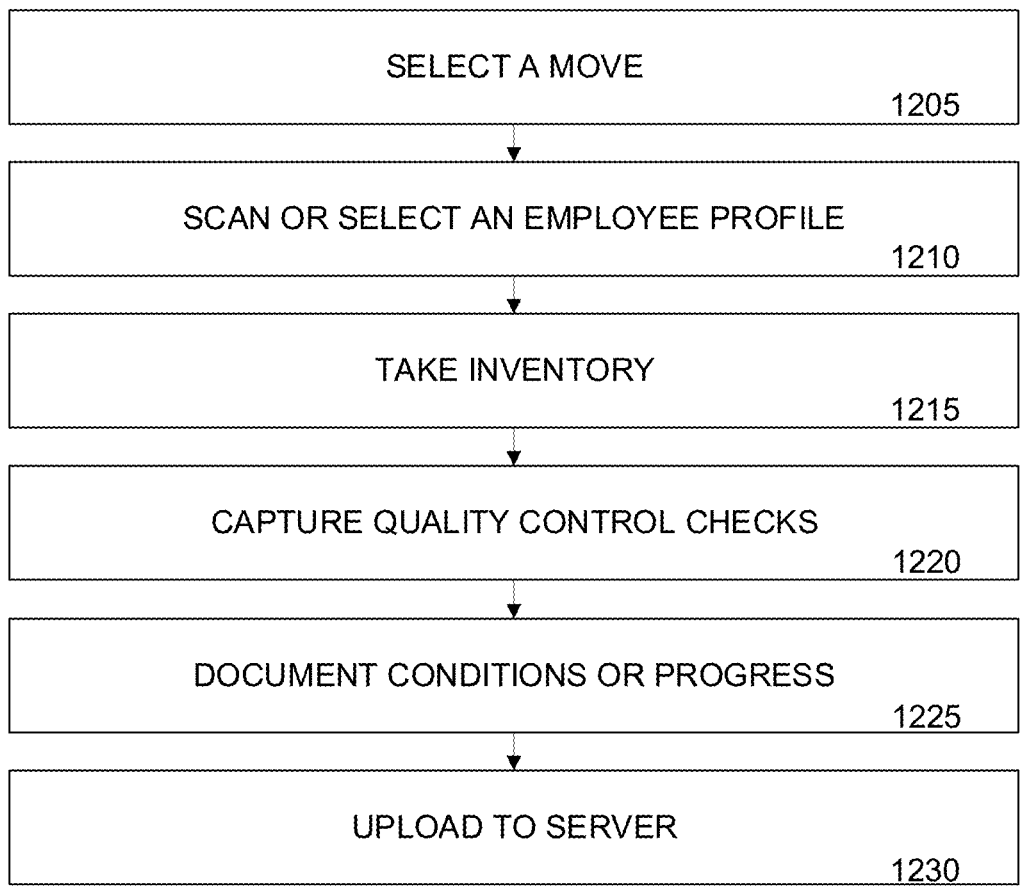
FIG. 12 illustrates an exemplary process flowchart for organizing a move, according to some embodiments of the present disclosure.

Referring now to FIG. 12, exemplary method steps for organizing a move are illustrated. At 1205, a move is selected. At 1210, an employee profile may be scanned or selected. At 1215, inventory may be taken. At 1220, quality control checks may be captured. At 1225, object conditions or move progress may be documented. At 1230, progress status or documentation may be uploaded to a server.

In some embodiments, any progress may be accessed in real-time by other users. In some implementations, users may communicate with one another within the system. In some aspects, the system may redirect a user as a need arises. For example, if a user needs extra help in a section, the system can detect someone finishing a route and redirect them elsewhere. In some embodiments, a user may access employee information relevant for the move.

For example, a user may see the items the employee has marked for the move. In some implementations, a user may indicate that an employee has not marked any items for a move. In some aspects, a manager may be notified and direct an employee to mark items they want moved. In some embodiments, a user may then receive an update when an employee is ready to move. In some implementations, a manager may receive a progress update indicating that an employee did not do their part in preparing for a move.

In some embodiments, a user may document the condition of an item prior to a move. In some implementations, a user may document the condition of an item after a move. In some aspects, this documentation may be uploaded to the network. In some embodiments, a user may access this information to coordinate accordingly. In some implementations, the system may organize this documentation visually for a user. In some aspects, the system may group like items for ease of access for a user.

In some implementations, a user may indicate their move order. In some aspects, other users may see this move order and provide input. In some embodiments, a supervisor may confirm or reject a move order. In some implementations, a user may see a requested move order. For example, a supervisor may need one department up and running before any other department can be set up. In some implementations, these requests may be made in real-time.

In some aspects, the system can reorganize and prioritize a move order once this request is made and push this out to users on the job. In some embodiments, supervisors may make requests to managers, who can then implement changes into the system. In some implementations, one or more supervisors or managers may see documentation as they are uploaded and note conditions of items as appropriate. For example, a medical facility may want to make sure that a particular instrument is in safe hands at every point in a chain of custody.

Figure 13:
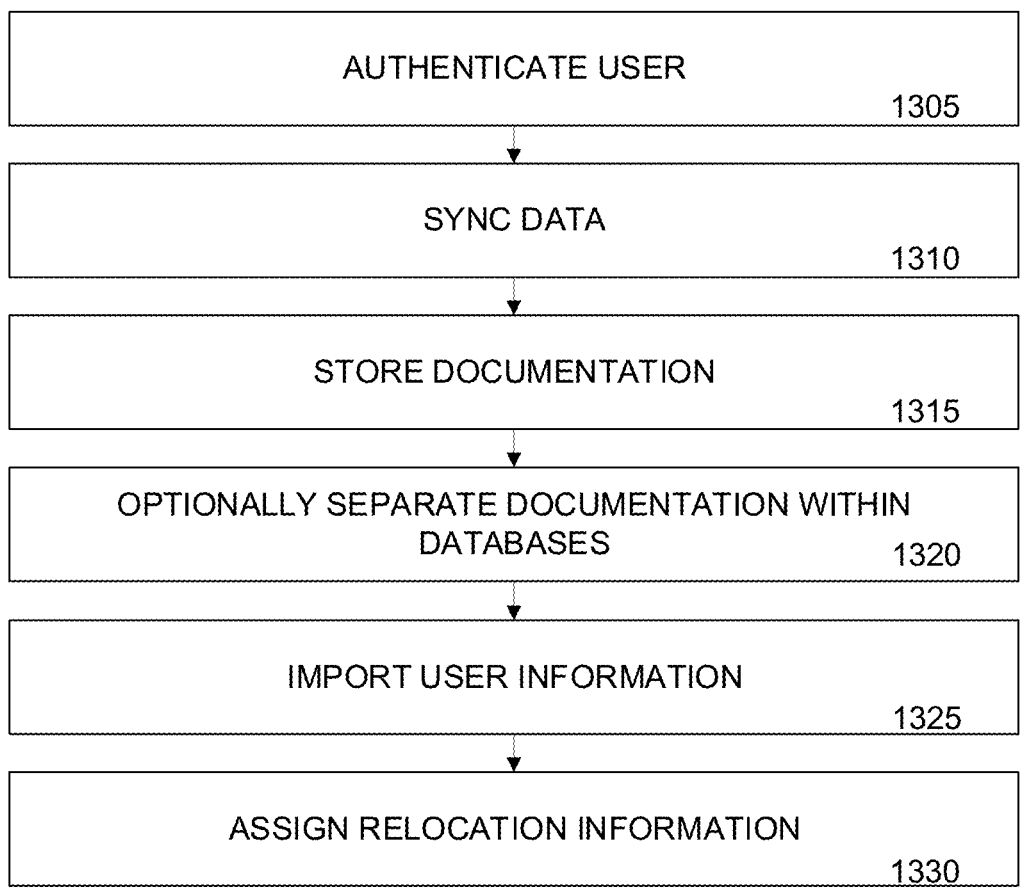
FIG. 13 illustrates an exemplary process flowchart for system integration, according to some embodiments of the present disclosure.

Referring now to FIG. 13, exemplary method steps for system integration are illustrated. At 1305, a user is authenticated. At 1310, data is synced. At 1315, documentation is stored. In some embodiments, this documentation may be notes, photographs, inputs, or location information, as non-limiting information. In some implementations, documentation may be separated for documentation within databases. In some aspects, at 1320, different types of data may be stored in different databases. For example, images may be stored in blob storage while a reference to each unique image file name may be stored with relocation data. At 1325, user information may be imported. At 1330, relocation information may be assigned.

Figure 14:
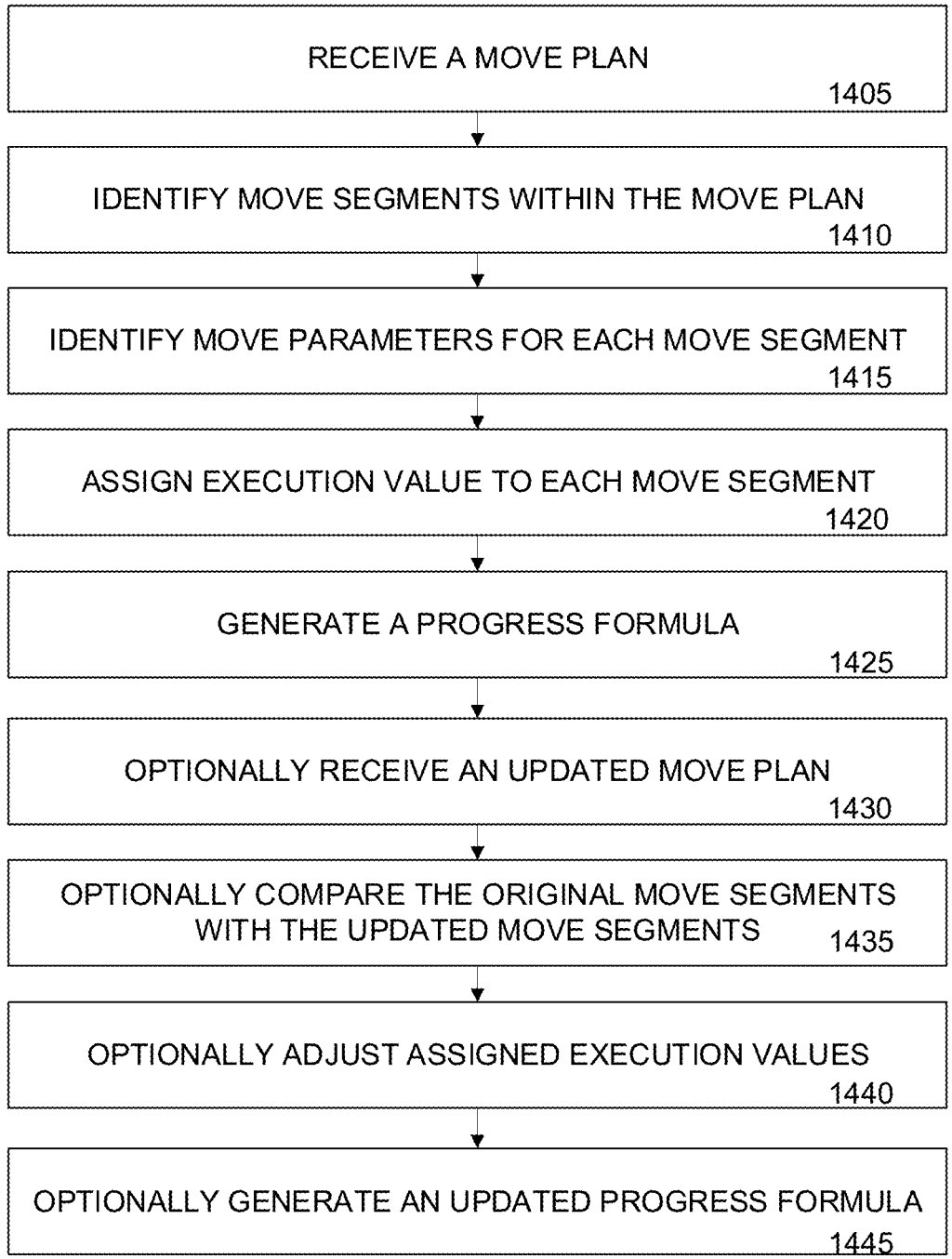
FIG. 14 illustrates an exemplary block diagram of an exemplary embodiment of a mobile device, according to some embodiments of the present disclosure.

Referring now to FIG. 14, exemplary method steps for generating a progress formula are illustrated. At 1405, a move plan may be received. At 1410, move segments within the move plan may be identified. At 1415, move parameters for each move segment may be identified. At 1420, execution values may be assigned to each move segment, such as described and illustrated with FIG. 11A-11D. At 1425, a progress formula may be generated.

In some aspects, the progress formula may be dynamic, and at 1430, an updated move plan may be received. In some embodiments, at 1435, the original move segments may be compared to the updated move segments. In some implementations, at 1440, the execution values may be adjusted. In some aspects, at 1445, an updated progress formula may be generated. In some implementations, move segments may be adjusted prior to the execution of the move plan, such as based on customer preferences, equipment or labor scheduling, relocator preferences, or changes in circumstances related to the move segments. In some embodiments, move segments may be adjusted once the move plan has been initiated, wherein the execution of the move plan may prompt changes in move segments.

As an illustrative example, a move segment may require permits prior to execution, and the permits may take longer than expected. The delay may force the timeline into a more congested travel time or a period where the move equipment may be more difficult to schedule, wherein the execution value of the move segment may be increased. Another move segment within the same move may include moving four hundred boxes, which may have been an estimate from the customer. The customer may in actuality only have three hundred boxes, which may decrease the execution value of the move segment.

In some embodiments, the adjustments may account for completed move segments, wherein adjusted execution values may be based on the remaining portion of the move plan. For example, where seventy percent of the move has been completed, the adjustments may only shift the pending execution values of the remaining thirty percent. In some aspects, adjustments may also adjust completed portions, where the adjustments for the pending move segments may increase or decrease their execution value to the point where the completed portion may be adjusted. For example, seventy percent of the move may have been originally presented as completed, and a significant underestimation of boxes may increase the execution value of a move segment. The increase in pending execution value may decrease the overall progress of the move.

Figure 15:
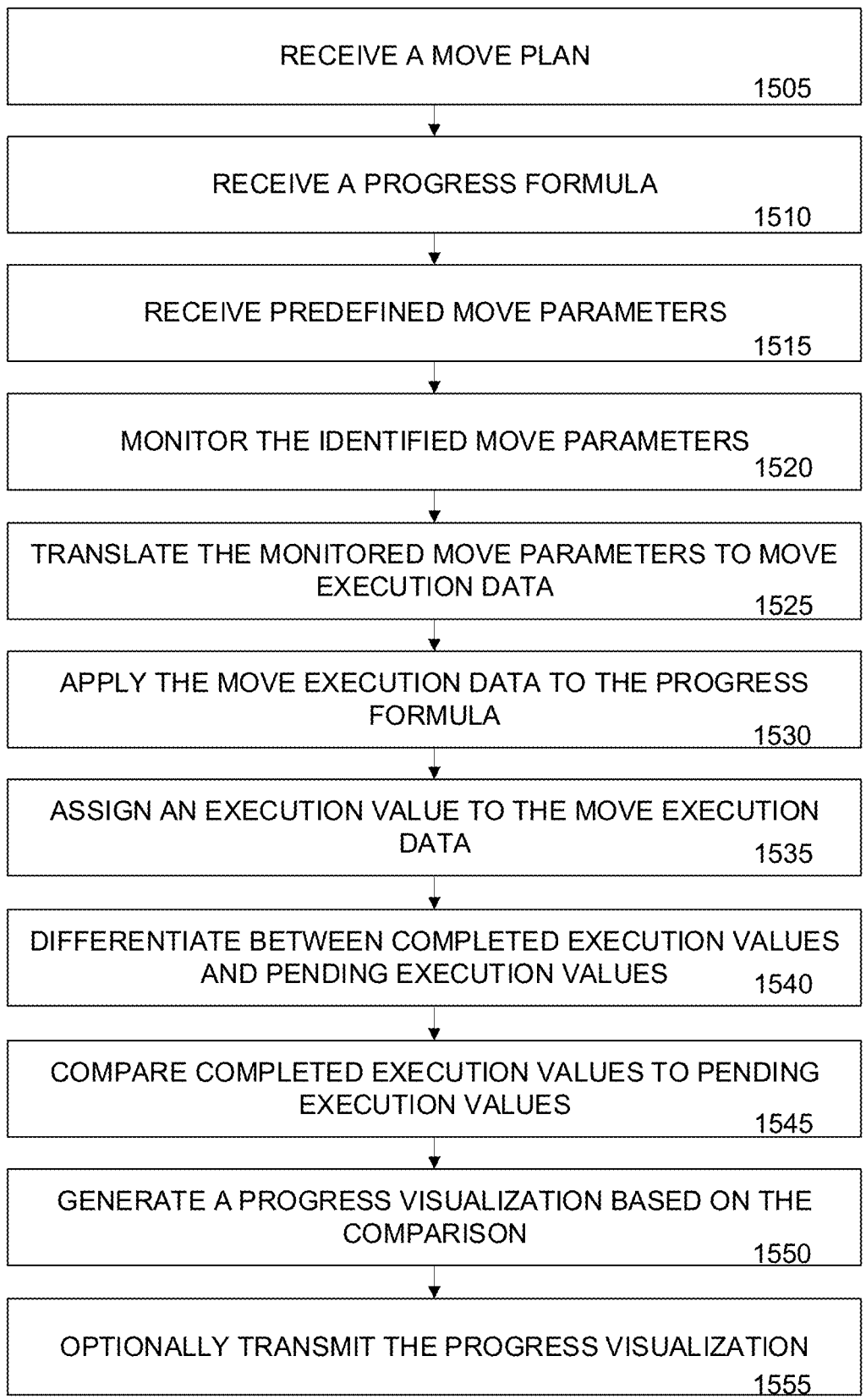
FIG. 15 illustrates an exemplary processing and interface system, according to some embodiments of the present disclosure.

Referring now to FIG. 15, exemplary method steps for assessing the execution progress of a move plan are illustrated. At 1505, a move plan may be received. At 1510, a progress formula may be received. At 1515, predefined move parameters may be received. At 1520, the move parameters may be monitored. At 1525, the monitored move parameters may be translated to move execution data. At 1530, the move execution data may be applied to the progress formula. At 1535, an execution value may be assigned to the move execution data. At 1540, completed execution values may be differentiated from pending execution values. At 1545, the completed execution values may be compared to pending execution values. At 1550, a progress visualization may be generated based on the comparison. In some embodiments, at 1555, the progress visualization may be transmitted.

As an illustrative example, the move plan may generally relate to relocating four employees with their cubicles. The move plan may include four move segments: relocating ten boxes, breaking down computer equipment at the origin, installing computer equipment at the destination, and relocating computer equipment. The move parameters may comprise one or more: status of employees to be moved, status of the boxes, location of the boxes, status of the computer equipment at origin, location of the computer equipment, status of the computer equipment at destination, location of movers, location of technicians, status of origin quality control checks, and status of destination quality control checks, as non-limiting examples.

The move parameters may be monitored and translated to execution data, which may be applied to the progress formula, and execution values may be assigned to the execution data. The combination of the execution values may indicate a progress of the move plan, and a progress visualization of a status bar may be generated. The status bar may be transmitted to the customer. In some aspects, the visualization may be updated in real time. In some embodiments, the visualization may update by move segment, wherein progress occurs when a move segment is initiated and completed.

Figure 16:
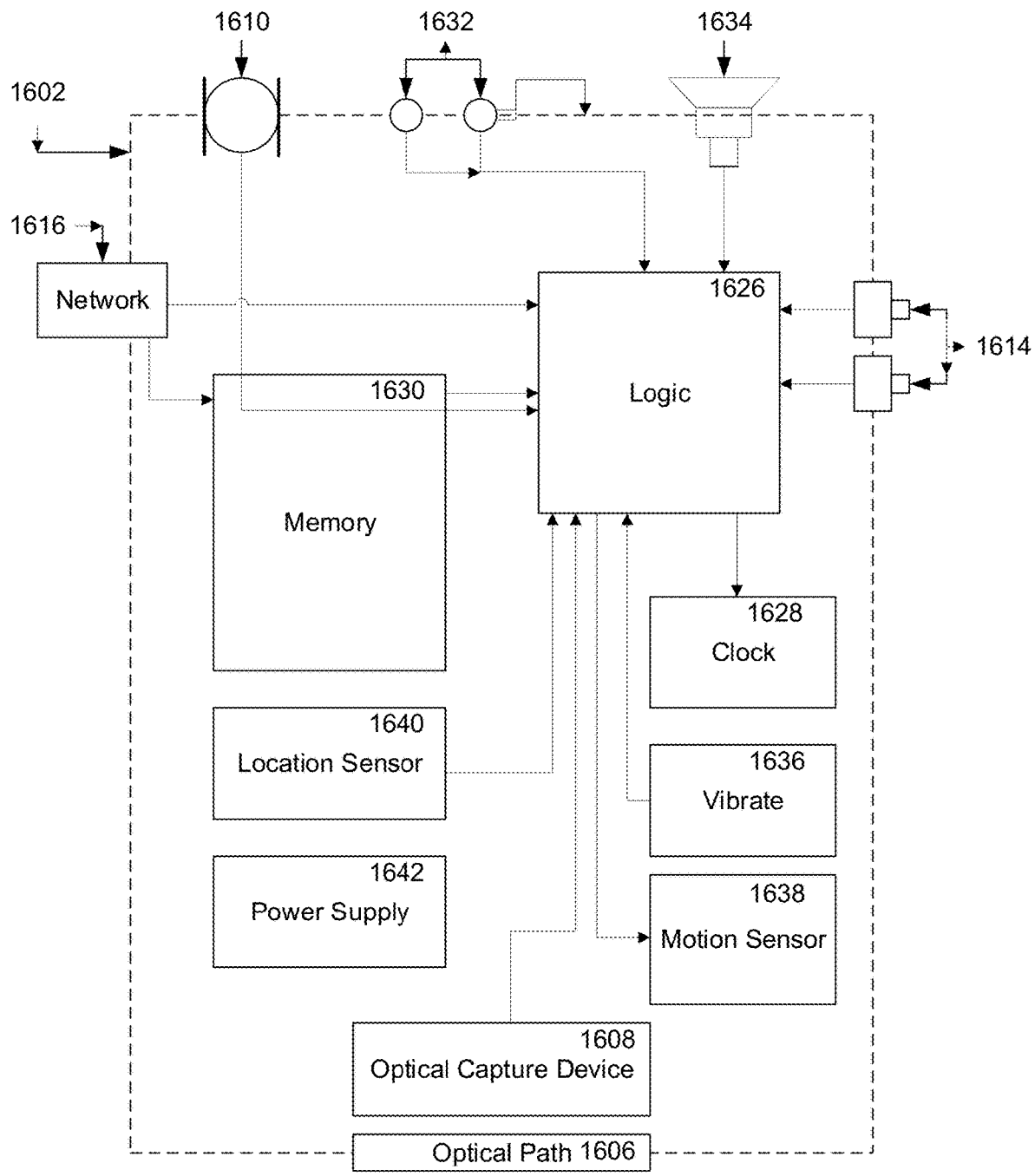
FIG. 16 illustrates an exemplary block diagram of an exemplary embodiment of a mobile device, according to some embodiments of the present disclosure.

Referring now to FIG. 16, an exemplary block diagram of an exemplary embodiment of a mobile device 1602 is illustrated. The mobile device 1602 may comprise an optical capture device 1608, which may capture an image and convert it to machine-compatible data, and an optical path 1606, typically a lens, an aperture, or an image conduit to convey the image from the rendered document to the optical capture device 1608. The optical capture device 1608 may incorporate a Charge-Coupled Device (CCD), a Complementary Metal Oxide Semiconductor (CMOS) imaging device, or an optical sensor of another type.

In some embodiments, the mobile device 1602 may comprise a microphone 1610, wherein the microphone 1610 and associated circuitry may convert the sound of the environment, including spoken words, into machine-compatible signals. Input facilities 1614 may exist in the form of buttons, scroll-wheels, or other tactile sensors such as touchpads. In some embodiments, input facilities 1614 may include a touchscreen display. Visual feedback 1632 to the user may occur through a visual display, touchscreen display, or indicator lights. Audible feedback 1634 may be transmitted through a loudspeaker or other audio transducer. Tactile feedback may be provided through a vibration module 1636.

In some aspects, the mobile device 1602 may comprise a motion sensor 1638, wherein the motion sensor 1638 and associated circuitry may convert the motion of the mobile device 1602 into machine-compatible signals. For example, the motion sensor 1638 may comprise an accelerometer, which may be used to sense measurable physical acceleration, orientation, vibration, and other movements. In some embodiments, the motion sensor 1638 may comprise a gyroscope or other device to sense different motions.

In some implementations, the mobile device 1602 may comprise a location sensor 1640, wherein the location sensor 1640 and associated circuitry may be used to determine the location of the device. The location sensor 1640 may detect Global Position System (GPS) radio signals from satellites or may also use assisted GPS where the mobile device may use a cellular network to decrease the time necessary to determine location. In some embodiments, the location sensor 1640 may use radio waves to determine the distance from known radio sources such as cellular towers to determine the location of the mobile device 1602. In some embodiments these radio signals may be used in addition to and/or in conjunction with GPS.

In some aspects, the mobile device 1602 may comprise a logic module 1626, which may place the components of the mobile device 1602 into electrical and logical communication. The electrical and logical communication may allow the components to interact. Accordingly, in some embodiments, the received signals from the components may be processed into different formats and/or interpretations to allow for the logical communication. The logic module 1626 may be operable to read and write data and program instructions stored in associated storage 1630, such as RAM, ROM, flash, or other suitable memory. In some aspects, the logic module 1626 may read a time signal from the clock unit 1628. In some embodiments, the mobile device 1602 may comprise an on-board power supply 1642. In some embodiments, the mobile device 1602 may be powered from a tethered connection to another device, such as a Universal Serial Bus (USB) connection.

In some implementations, the mobile device 1602 may comprise a network interface 1616, which may allow the mobile device 1602 to communicate and/or receive data to a network and/or an associated computing device. The network interface 1616 may provide two-way data communication. For example, the network interface 1616 may operate according to an internet protocol. As another example, the network interface 1616 may comprise a local area network (LAN) card, which may allow a data communication connection to a compatible LAN. As another example, the network interface 1616 may comprise a cellular antenna and associated circuitry, which may allow the mobile device to communicate over standard wireless data communication networks. In some implementations, the network interface 1616 may comprise a Universal Serial Bus (USB) to supply power or transmit data. In some embodiments, other wireless links known to those skilled in the art may also be implemented.

Figure 17:
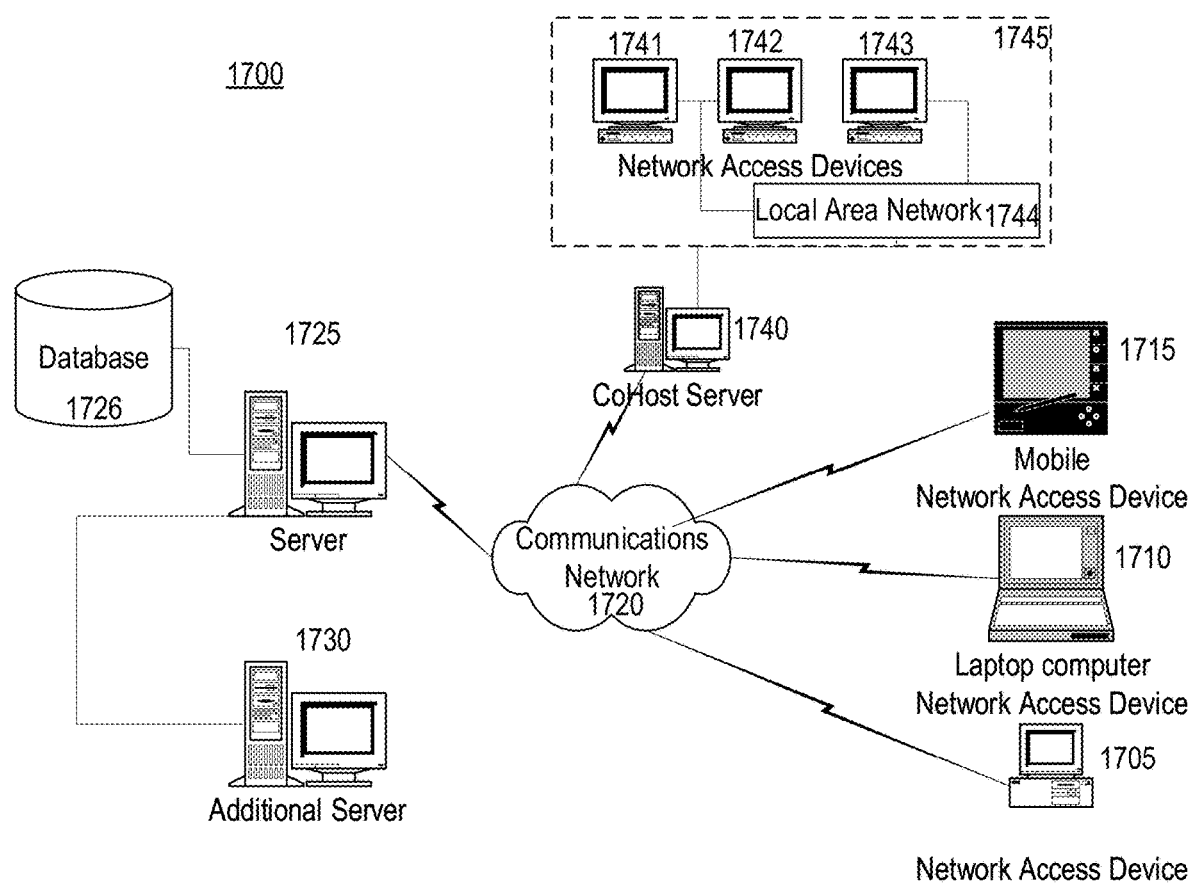
FIG. 17 illustrates an exemplary processing and interface system, according to some embodiments of the present disclosure.

Referring now to FIG. 17, an exemplary processing and interface system 1700 is illustrated. In some aspects, access devices 1715, 1710, 1705, such as a paired portable device 1715 or laptop computer 1710 may be able to communicate with an external server 1725 though a communications network 1720. The external server 1725 may be in logical communication with a database 1726, which may comprise data related to identification information and associated profile information. In some embodiments, the server 1725 may be in logical communication with an additional server 1730, which may comprise supplemental processing capabilities.

In some aspects, the server 1725 and access devices 1705, 1710, 1715 may be able to communicate with a cohost server 1740 through a communications network 1720. The cohost server 1740 may be in logical communication with an internal network 1745 comprising network access devices 1741, 1742, 1743 and a local area network 1744. For example, the cohost server 1740 may comprise a payment service, such as PayPal or a social network, such as Facebook or LinkedIn.

Figure 18:
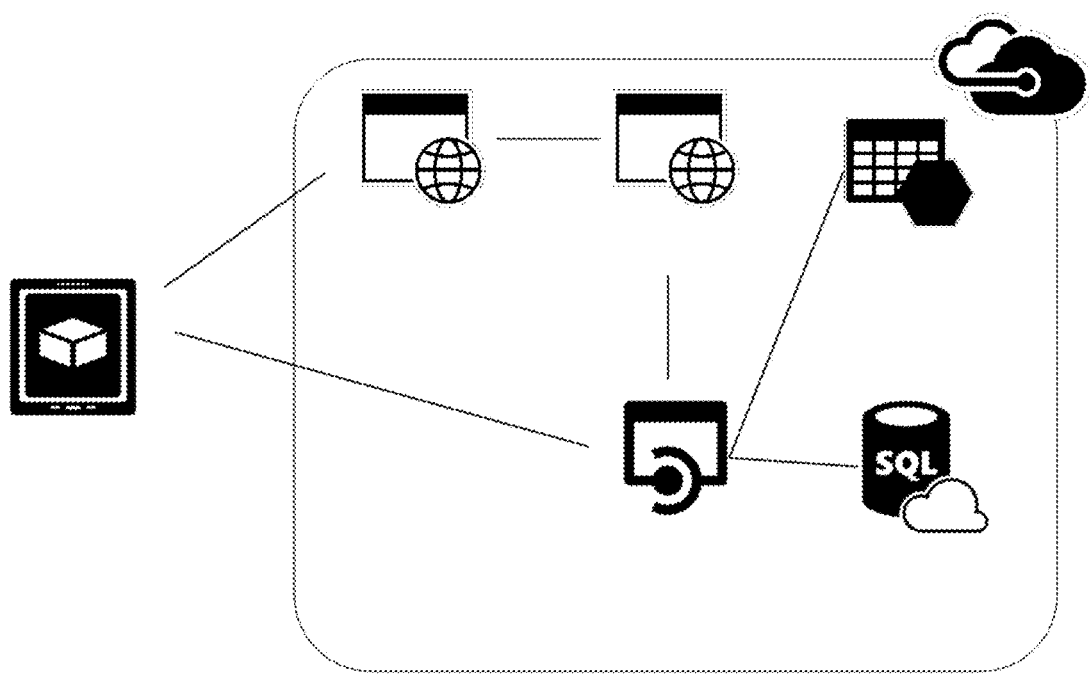
FIG. 18 illustrates an exemplary processing and interface system, according to some embodiments of the present disclosure.

Referring now to FIG. 18, an exemplary processing and interface system is illustrated. In some embodiments, a mobile application and an internet application may interact with one another. In some implementations, these applications may have a shared pool of resources using cloud computing. In some aspects, data may be synced between a mobile application and backend storage by an online application programming interface (API). In some embodiments, data may be stored in different databases, such as blob storage or a cloud-based database. In some implementations an administrative hierarchy may be assigned to anyone who accesses the system.

CONCLUSION

A number of embodiments of the present disclosure have been described. While this specification contains many specific implementation details, these should not be construed as limitations on the scope of any disclosures or of what may be claimed, but rather as descriptions of features specific to particular embodiments of the present disclosure.

Certain features that are described in this specification in the context of separate embodiments can also be implemented in combination or in a single embodiment. Conversely, various features that are described in the context of a single embodiment can also be implemented in combination in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous.

Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order show, or sequential order, to achieve desirable results. In certain implementations, multitasking and parallel processing may be advantageous. Nevertheless, it will be understood that various modifications may be made without departing from the spirit and scope of the claimed disclosure.

What is claimed is:

1. A relocation tracking system comprising:
  a first local computing device generating network access requests for a relocation tracking;
  one or more memory resources comprising:
    a customer profile database comprising a plurality of customer profiles; and
    a visualization database comprising a plurality of progress visualization types;
  a remote server coupled to the first local computing device, the one or more memory resources, and an internet computer network, wherein the remote server is configured to:
    receive a first move plan comprising at least a first origin, a first destination, a move date, a first customer profile, and an estimated inventory;
    receive a first progress formula, wherein the first progress formula is based at least in part on the first move plan and a known and predictive data set compiled and extracted from a history of executed moves;
    receive a first set of predefined move parameters related to an execution of the first move plan;
    monitor the first set of predefined move parameters, wherein a monitoring is stored as monitored predefine move parameters, wherein the monitoring occurs a plurality of times automatically;
    automatically generate printable labels for the estimated inventory;
    automatically translate monitored predefined move parameters to move execution data;
    automatically apply the move execution data to the first progress formula;
    assign a first set of execution values to the move execution data, wherein the first set of execution values is based on an application of the move execution data to the first progress formula, wherein the first set of execution values indicates a relative impact of each portion of the estimated inventory on progress of the first move plan, and wherein the first set of execution values is based at least in part on three or more quantity of each portion of the estimated inventory, handling requirements of each portion of the estimated inventory, the known and predictive data set, and logistics requirements of each portion of the estimated inventory;
    assign user task automatically, wherein assignment is based on the first set of predefined move parameters;
    differentiate between completed execution values and pending execution values within the first set of execution values;
    compare the completed execution values to pending execution values as determined by the first progress formula; and
    automatically generate a first progress visualization based on a comparison of the completed execution values to pending execution values;
    receive a second move plan comprising one or more a second origin, a second destination, an updated move date, a second customer profile, and an updated estimated inventory;
    generating a second set of labels automatically for the updated estimated inventory;
    receiving a second progress formula, wherein the second progress formula is based at least in part on the second move plan;
    receiving a second set of predefined move parameters related to an execution of the second move plan;
    translate monitored predefined move parameters to updated move execution data;
    assign a second set of execution values to the updated move execution data; wherein the second set of execution values is based on the application of the updated move execution data to the first progress formula;
    differentiate between completed execution values and pending execution values within the second set of execution values;
    compare the completed execution values to pending execution values from the second set of execution values; and
    generate a second progress visualization based on the comparison of the completed execution values to pending execution values from the second set of execution values, wherein the updated move execution data adjusts in real time based on one or more changes in one or more the first move plan, the first set of predefined move parameters, and the first progress formula.

2. The system of claim 1, wherein the first progress formula is based at least in part on one or more the customer profile, the first move plan, and the first set of predefined move parameters.

3. The system of claim 2, wherein the first move plan comprises a plurality of move segments, and wherein the first progress formula is based at least in part on the plurality of move segments.

4. The system of claim 3, wherein the remote server is further configured to associate the move execution data with the plurality of move segments, and wherein the first set of execution values is organized by move segments.

5. The system of claim 4, wherein comparing the completed execution values to pending execution values occurs by move segment, wherein the completed execution values and pending execution values of each move segment are compared.

6. The system of claim 5, wherein the first progress visualization is further based on completion of each move segment, wherein each move segment is further broken down into tasks disproportional to a composition of move segments of the first move plan.

7. The system of claim 1, wherein the visualization database further comprises a plurality of interface types, wherein the interface types comprise at least one progress visualization, and the remote server is further configured to provide a first interface with the first progress visualization to a second local computing device, wherein the remote server is couplable to the second local computing device.

8. The system of claim 7, wherein the first interface is customizable based at least in part on the first customer profile.

9. A method for relocation tracking, the method comprising the method steps of:
  receiving a first move plan comprising at least a first origin, a first destination, a move date, a first customer profile, and an estimated inventory;
  automatically generating a first set of printable labels for the estimated inventory;

receiving a first progress formula, wherein the first progress formula is based at least in part on the first move plan;

receiving a first set of predefined move parameters related to an execution of the first move plan;

monitoring the first set of predefined move parameters, wherein a monitoring is stored as monitored predefine move parameters;

translating monitored predefined move parameters to move execution data; applying the move execution data to the first progress formula;

assigning a first set of execution values to the move execution data, wherein the first set of execution values is based on an application of the move execution data to the first progress formula, wherein the first set of execution values indicates a relative impact of each portion of the estimated inventory on progress of the first move plan, and wherein the first set of execution values is based at least in part on one or more quantity of each portion of the estimated inventory, handling requirements of each portion of the estimated inventory, and logistics requirements of each portion of the estimated inventory;

assigning user tasks automatically, wherein assignment is based on the first set of predefined move parameters;

differentiating between completed execution values and pending execution values within the first set of execution values;

comparing the completed execution values to pending execution values; and generating a first progress visualization based on a comparison of the completed execution values to pending execution values;

receiving a second move plan comprising one or more a second origin, a second destination, an updated move date, a second customer profile, and an updated estimated inventory;

automatically generating a second set of printable labels for the updated estimated inventory;

receiving a second progress formula, wherein the second progress formula is based at least in part on the second move plan;

receiving a second set of predefined move parameters related to an execution of the second move plan;

applying the move execution data to the second progress formula;

assigning a second set of execution values to the move execution data, wherein the second set of execution values is based on an application of the move execution data to the second progress formula, wherein the second set of execution values indicates a relative impact of each portion of the estimated inventory on progress of the second move plan, and wherein the second set of execution values is based at least in part on one or more quantity of each portion of the updated estimated inventory, handling requirements of each portion of the updated estimated inventory, and logistics requirements of each portion of the updated estimated inventory;

automatically assigning updated user tasks, wherein the assigning is based on the second set of predefined move parameters;

differentiating between completed execution values and pending execution values within the second set of execution values;

comparing the completed execution values to pending execution values; and generate a second progress visualization based on the comparison of the completed execution values to pending execution values from the second set of execution values, wherein the updated move execution data adjusts in real time based on one or more changes in one or more the first move plan, the first set of predefined move parameters, and the first progress formula.

10. The method of claim 9, wherein the first progress formula is based at least in part on one or more the customer profile, the first move plan, and the first set of predefined move parameters.

11. The method of claim 10, wherein the first move plan comprises a plurality of move segments, and wherein the first progress formula is based at least in part on the plurality of move segments.

12. The method of claim 11, further comprising the method step of associating the move execution data with the plurality of move segments, wherein the first set of execution values is organized by move segments.

13. The method of claim 12, wherein comparing the completed execution values to pending execution values occurs by move segment, wherein the completed execution values and pending execution values of each move segment are compared.

14. The method of claim 13, wherein the first progress visualization is further based on completion of each move segment.

15. The method of claim 9, wherein the updated move execution data adjusts in real time based on one or more changes in one or more the first move plan, the first set of predefined move parameters, and the first progress formula.

16. The method of claim 9, further comprising the method step of providing a first interface with the first progress visualization.

17. The method of claim 16, wherein the first interface is customizable based at least in part on the first customer profile.

* * * * *